(12) United States Patent
Endo et al.

(10) Patent No.: US 10,612,472 B2
(45) Date of Patent: Apr. 7, 2020

(54) FLOW RATIO CALCULATION DEVICE, CONTROL DEVICE PROVIDED WITH SAME, GAS TURBINE PLANT PROVIDED WITH SAID CONTROL DEVICE, FLOW RATIO CALCULATION METHOD, AND METHOD FOR CONTROLLING FUEL SYSTEM

(71) Applicant: MITSUBISHI HITACHI POWER SYSTEMS, LTD., Kanagawa (JP)

(72) Inventors: Yoji Endo, Yokohama (JP); Jotaro Nakagawa, Yokohama (JP); Yoshiaki Ochiai, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 583 days.

(21) Appl. No.: 15/325,908

(22) PCT Filed: Jun. 8, 2015

(86) PCT No.: PCT/JP2015/066496
§ 371 (c)(1),
(2) Date: Jan. 12, 2017

(87) PCT Pub. No.: WO2016/021298
PCT Pub. Date: Feb. 11, 2016

(65) Prior Publication Data
US 2018/0209352 A1    Jul. 26, 2018

(30) Foreign Application Priority Data

Aug. 6, 2014  (JP) .................................. 2014-160605

(51) Int. Cl.
*F02C 9/28*    (2006.01)
*F23N 1/00*    (2006.01)
(Continued)

(52) U.S. Cl.
CPC ................ *F02C 9/28* (2013.01); *F23N 1/002* (2013.01); *F23N 5/16* (2013.01); *F23R 3/28* (2013.01);
(Continued)

(58) Field of Classification Search
CPC .... F02C 9/20; F02C 9/26; F02C 9/263; F02C 9/28; F02C 9/34; F02C 9/50; F02C 9/54;
(Continued)

(56) References Cited

U.S. PATENT DOCUMENTS 6,092,362 A *   7/2000   Nagafuchi ................ F02C 9/34
                                                      60/39.281
7,797,942 B2 *  9/2010   Saitoh ..................... F23R 3/343
                                                      60/737

(Continued)

FOREIGN PATENT DOCUMENTS

JP   2004-108315   4/2004
JP   2006-170194   6/2006
(Continued)

OTHER PUBLICATIONS

International Search Report dated Sep. 8, 2015 in corresponding International (PCT) Application No. PCT/JP2015/066496, with English translation.

(Continued)

*Primary Examiner* — Gerald L Sung
*Assistant Examiner* — James P McGlynn
(74) *Attorney, Agent, or Firm* — Wenderoth, Lind & Ponack, L.L.P.

(57) ABSTRACT

A flow ratio calculation device includes: a flow volume ratio computer that, using a predetermined relationship between a first parameter that can express a combustion state in a combustor and a flow volume ratio of fuels flowing through multiple fuel systems, is configured to find the flow volume (Continued)

ratio based on a value of the first parameter; a correction value computer configured to find a correction value of the flow volume ratio when a load of a gas turbine changes; a fluctuation sensor configured to sense fluctuations in a value correlated with the load of the gas turbine; and a corrector configured to correct the flow volume ratio found by the flow volume ratio computer with the correction value found by the correction value computer when a fluctuation in the value correlated with the load of the gas turbine is sensed by the fluctuation sensor.

17 Claims, 11 Drawing Sheets

(51) Int. Cl.
  *F23N 5/16* (2006.01)
  *F23R 3/34* (2006.01)
  *F23R 3/28* (2006.01)
  *F02C 9/34* (2006.01)
  *F02C 9/26* (2006.01)
  *F23R 3/36* (2006.01)

(52) U.S. Cl.
  CPC .............. *F23R 3/34* (2013.01); *F23R 3/346* (2013.01); *F02C 9/26* (2013.01); *F02C 9/263* (2013.01); *F02C 9/34* (2013.01); *F05D 2260/96* (2013.01); *F05D 2260/964* (2013.01); *F23N 2237/02* (2020.01); *F23N 2241/20* (2020.01); *F23R 3/286* (2013.01); *F23R 3/36* (2013.01); *F23R 2900/00013* (2013.01)

(58) Field of Classification Search
  CPC .. F02C 9/56; F23R 3/286; F23R 3/346; F23R 2900/00013; F05D 2260/96; F05D 2260/964; F05D 2270/14
  See application file for complete search history.

(56) References Cited

U.S. PATENT DOCUMENTS

2007/0079593 A1* 4/2007 Fujii ..................... F02C 7/1435
  60/39.27
2010/0050652 A1 3/2010 Skipper

FOREIGN PATENT DOCUMENTS

| JP | 2007-77866 | 3/2007 |
| JP | 2010-127242 | 6/2010 |
| JP | 2012-077662 | 4/2012 |
| JP | 2012-92681 | 5/2012 |
| JP | 2013-096303 | 5/2013 |

OTHER PUBLICATIONS

Written Opinion of the International Searching Authority dated Sep. 8, 2015 in corresponding International (PCT) Application No. PCT/JP2015/066496, with English translation.

* cited by examiner

FLOW RATIO CALCULATION DEVICE, CONTROL DEVICE PROVIDED WITH SAME, GAS TURBINE PLANT PROVIDED WITH SAID CONTROL DEVICE, FLOW RATIO CALCULATION METHOD, AND METHOD FOR CONTROLLING FUEL SYSTEM

CROSS-REFERENCE TO RELATED APPLICATION

This application claims priority based on Japanese Patent Application No. 2014-160605 filed on Aug. 6, 2014, the contents of which are incorporated herein by reference.

TECHNICAL FIELD

The present invention relates to technology for calculating a flow volume ratio of each of fuels supplied to a combustor from multiple fuel systems.

BACKGROUND ART

A gas turbine includes a compressor that compresses air, a combustor that generates a combustion gas by burning a fuel in the air compressed by the compressor, and a turbine driven using the combustion gas. Some combustors have a pilot burner for diffusion combustion of the fuel and a main burner for premixed combustion of the fuel. With such a combustor, it is necessary to manage a ratio of the flow volumes of the fuels supplied to the respective burners.

For example, according to the technology disclosed in Japanese Unexamined Patent Application Publication No. 2012-077662 A, a flow volume ratio of fuels supplied to the respective burners is set in accordance with a value indicated by a combustion load command, which is the temperature of an inlet of a turbine into which combustion gas from the combustor flows made dimensionless. Furthermore, this technology suppresses combustion oscillation that may occur during runback operations, which are operations for quickly reducing the load, by changing the fuel flow volume ratio determined in accordance with the combustion load command value during the runback operations.

Technical Problem

The technology disclosed in Japanese Unexamined Patent Application Publication No. 2012-077662 A can suppress combustion oscillation during runback operations. However, it is also desirable to burn the fuel in the combustor in a stable manner in cases such as when reducing the load outside of runback operations, or conversely when increasing the load.

SUMMARY OF INVENTION

In light of the foregoing, an object of the present invention is to provide technology capable of increasing combustion stability in a combustor during various load changes.

Solution to Problem

To achieve the above-described object, a flow ratio calculation device according to an aspect of the present invention is a flow ratio calculation device used in a gas turbine, the gas turbine including multiple fuel systems, a compressor that generates compressed air by compressing air, a combustor that generates a combustion gas by burning fuels from the multiple fuel systems in the compressed air, and a turbine driven by the combustion gas. The flow ratio calculation device calculates a flow volume ratio of the fuels flowing in the multiple fuel systems, and includes: a flow volume ratio computer that receives a value of a first parameter among multiple parameters capable of expressing a combustion state in the combustor, and finds the now volume ratio based on the received value of the first parameter using a predetermined relationship between the first parameter and the flow volume ratio; a correction value computer that finds a correction value of the flow volume ratio at a time when a load of the gas turbine changes; a fluctuation sensor that senses a fluctuation in a load correlated value that is a value changing in correlation with changes in the load of the gas turbine or that is a value of the load; and a corrector that, upon a fluctuation in the load correlated value being sensed by the fluctuation sensor, corrects the flow volume ratio found by the now volume ratio computer with the correction value found by the correction value computer.

Combustion conditions in a combustor are sometimes conditions not conducive to stable combustion within the combustor when the value of a predetermined parameter, among multiple parameters capable of expressing a combustion state in the combustor, is a predetermined value. If under such unconducive conditions the total flow volume of fuels fed to the combustor is changed, or in other words, if the load is changed, there are cases where the stability of the combustion in the combustor will be lost. Accordingly, with the flow ratio calculation device, the flow volume ratio found by the flow volume ratio computer is corrected with the correction value upon the fluctuation sensor sensing a fluctuation in the load correlated value. Thus, according to this flow ratio calculation device, combustion stability can be achieved within the combustor at times when the load correlated value fluctuates.

Here, in the above-described flow ratio calculation device, the correction value computer may receive a value of a second parameter, among the multiple parameters, that is different from the first parameter, and find the correction value based on the received value of the second parameter using a predetermined relationship between the second parameter and the correction value.

In this case, the first parameter may be an inlet temperature correlated value that is a value changing in correlation with changes in an inlet temperature of the combustion gas in the turbine or that is the inlet temperature. The second parameter may be one of an output of the gas turbine, a load percentage that is a percentage of a current load relative to a maximum load permitted by the gas turbine, a flow volume of all fuels supplied to the combustor from the multiple fuel systems, and a flow volume of air taken into the compressor.

In any one of the above-described flow ratio calculation devices in which the first parameter and the second parameter are received, the correction value computer may include an increase time correction value computer that finds a correction value based on the value of the second parameter when the load correlated value is increasing, using a predetermined increase time relationship between the second parameter and the correction value at the time when the load correlated value is increasing, and a decrease time correction value computer that finds a correction value based on the value of the second parameter when the load correlated value is decreasing, using a predetermined decrease time relationship between the second parameter and the correction value at the time when the load correlated value is decreasing. The corrector may correct the flow volume ratio found by the flow volume ratio computer with the correction value found by the increase time correction value computer upon the fluctuation sensor sensing an increase in the load correlated value, and may correct the flow volume ratio found by the flow volume ratio computer with the correction value found by the decrease time correction value computer upon the fluctuation sensor sensing a decrease in the load correlated value.

Additionally, in any one of the above-described flow ratio calculation devices, the corrector may include a correction value adjuster that changes the correction value to be outputted so as to be closer to the correction value found by the correction value computer with the passage of time, and a flow volume ratio corrector that corrects the flow volume ratio found by the flow volume ratio computer with the correction value outputted from the correction value adjuster.

Additionally, in any one of the above-described flow ratio calculation devices, the combustor may include a pilot burner and a main burner that spray fuels. The gas turbine may include, as the multiple fuel systems, a pilot fuel system that supplies a fuel to the pilot burner and a main fuel system that supplies a fuel to the main burner. The flow volume ratio may include a pilot fuel ratio that is a ratio of a flow volume of the fuel supplied to the combustor from the pilot fuel system relative to a total flow volume of the fuels supplied to the combustor from the multiple fuel systems.

In any one of the above-described flow ratio calculation devices in which the first parameter and the second parameter are received, the combustor may include a pilot burner and a main burner that spray fuels. The gas turbine may include, as the multiple fuel systems, a pilot fuel system that supplies a fuel to the pilot burner and a main fuel system that supplies a fuel to the main burner. The flow volume ratio may include a pilot fuel ratio that is a ratio of a flow volume of the fuel supplied to the combustor from the pilot fuel system relative to a total flow volume of the fuels supplied to the combustor from the multiple fuel systems. The correction value computer may include an increase time correction value computer that finds a correction value based on the value of the second parameter when the load correlated value is increasing, using a predetermined increase time relationship between the second parameter and the correction value at the time when the load correlated value is increasing, and a decrease time correction value computer that finds a correction value based on the value of the second parameter when the load correlated value is decreasing, using a predetermined decrease time relationship between the second parameter and the correction value at the time when the load correlated value is decreasing. The corrector may correct the flow volume ratio found by the flow volume ratio computer with the correction value found by the increase time correction value computer upon the fluctuation sensor sensing an increase in the load correlated value, and may correct the flow volume ratio found by the flow volume ratio computer with the correction value found by the decrease time correction value computer upon the fluctuation sensor sensing a decrease in the load correlated value. The decrease time correction value computer may calculate a correction value having a greater value than the correction value found by the increase time correction value computer when the value of the second parameter is the same value.

In addition, in the flow ratio calculation device including the pilot ratio as the flow volume ratio, the correction value computer may calculate the correction value so as to increase the pilot fuel ratio calculated by the flow volume ratio computer.

In this case, upon the fluctuation sensor sensing a decrease in the load correlated value, the corrector may correct the pilot fuel ratio using the correction value found by the correction value computer so that the pilot fuel ratio calculated by the flow volume ratio computer increases.

Additionally, in any one of the above-described flow ratio calculation devices, the combustor may include a burner that sprays a fuel. The gas turbine may include, as the multiple fuel systems, a burner fuel system that supplies a fuel to the burner and a top hat fuel system that supplies a fuel into air delivered to the burner. The flow volume ratio may include a top hat fuel ratio that is a ratio of a flow volume of the fuel supplied to the combustor from the top hat fuel system relative to a total flow volume of the fuels supplied to the combustor from the multiple fuel systems.

To achieve the above-described object, a control device according to an aspect of the present invention includes: any one of the above-described flow ratio calculation devices; a total flow volume computer that finds a total flow volume of the fuels supplied to the combustor from the multiple fuel systems; a system flow volume computer that finds a fuel flow volume for each of the multiple fuel systems using the total flow volume found by the total flow volume computer and the flow volume ratio calculated by the flow ratio calculation device; and a valve controller that outputs a control signal to a fuel flow volume adjustment valve provided in each of the multiple fuel systems so that the fuel flow volume in each of the multiple fuel systems becomes the fuel flow volume found by the system flow volume computer.

Here, the control device may further include a combustion load command generator that generates a combustion load command value changing in positive correlation with changes in the inlet temperature of the combustion gas in the turbine, and the flow volume ratio computer of the flow ratio calculation device may calculate a flow volume ratio based on the combustion load command value, using the combustion load command value as the value of the first parameter.

Additionally, in any one of the above-described control devices, the fluctuation sensor may sense a fluctuation in the load correlated value with the total flow volume found by the total flow volume computer serving as the load correlated value.

To achieve the above-described object, a gas turbine plant according to an aspect of the invention includes any one of the above-described control devices, and the gas turbine.

To achieve the above-described object, a flow ratio calculation method according to an aspect of the present invention is a flow ratio calculation method used in a gas turbine, the gas turbine including multiple fuel systems, a compressor that generates compressed air by compressing air, a combustor that generates a combustion gas by burning fuels from the multiple fuel systems in the compressed air, and a turbine driven by the combustion gas. The flow volume ratio calculation method calculates a flow volume ratio of the fuels flowing in the multiple fuel systems, and includes: a flow volume ratio computation process of receiving a value of a first parameter among multiple parameters capable of expressing a combustion state in the combustor, and finding the flow volume ratio based on the received value of the first parameter using a predetermined relationship between the first parameter and the flow volume ratio; a correction value computation process of finding a correction value of the flow volume ratio at a time when a load of the gas turbine changes; a fluctuation sensing process of sensing a fluctuation in a load correlated value that is a value changing in correlation with changes in the load of the gas turbine or that is a value of the load; and a correction process of, upon a fluctuation in the load correlated value being sensed in the fluctuation sensing process, correcting the flow volume ratio found in the flow volume ratio computation process with the correction value found in the correction value computation process.

Here, in the above-described flow ratio calculation method, in the correction value computation process, a value of a second parameter, among the multiple parameters, that is different from the first parameter may be received, and the correction value based on the received value of the second parameter may be found using a predetermined relationship between the second parameter and the correction value.

In this case, the first parameter may be an inlet temperature correlated value that is a value changing in correlation with changes in an inlet temperature of the combustion gas in the turbine or that is the inlet temperature; and the second parameter may be one of an output of the gas turbine, a load percentage that is a percentage of a current load relative to a maximum load permitted by the gas turbine, a flow volume of all fuels supplied to the combustor from the multiple fuel systems, and a flow volume of air taken into the compressor.

In any one of the above-described flow ratio calculation methods in which the first parameter and the second parameter are received, the correction value computation process may include an increase time correction value computation process of finding a correction value based on the value of the second parameter when the load correlated value is increasing, using a predetermined increase time relationship between the second parameter and the correction value of the flow volume ratio at the time when the load correlated value is increasing, and a decrease time correction value computation process of finding a correction value based on the value of the second parameter when the load correlated value is decreasing, using a predetermined decrease time relationship between the second parameter and the correction value of the flow volume ratio at the time when the load correlated value is decreasing. In the correction process, upon an increase in the load correlated value being sensed in the fluctuation sensing process, the flow volume ratio found in the flow volume ratio computation process may be corrected with the correction value found in the increase time correction value computation process, and upon a decrease in the load correlated value being sensed in the fluctuation sensing process, the flow volume ratio found in the flow volume ratio computation process may be corrected with the correction value found in the decrease time correction value computation process.

Additionally, in any one of the above-described flow ratio calculation methods, the correction process may include a correction value adjustment process of changing the correction value to be outputted so as to be closer to the correction value found in the correction value computation process with the passage of time, and a flow volume ratio correction process of correcting the flow volume ratio found in the flow volume ratio computation process using the correction value changed in the correction value adjustment process.

To achieve the above-described object, a fuel system control method according to an aspect of the invention executes any one of the above-described flow ratio calculation methods, and further executes: a total flow volume computation process of finding a total flow volume of the fuels supplied to the combustor from the multiple fuel systems; a system flow volume computation process of finding a fuel flow volume for each of the multiple fuel systems using the total flow volume found in the total flow volume computation process and the flow volume ratio calculated by the flow ratio calculation method; and a valve control process of outputting a control signal to a fuel flow volume adjustment valve provided in each of the multiple fuel systems so that the fuel flow volume in each of the multiple fuel systems becomes the fuel flow volume found in the system flow volume computation process.

Advantageous Invention

According to an aspect of the present invention, the combustion stability can be increased in combustors at times of load decreases and at times of load increases, as well as at times of runback operations.

EMBODIMENTS

Hereinafter, an embodiment of a flow ratio calculation device, a control device, and a gas turbine plant including the control device according to the present invention will be described using the drawings.

Figure 1:
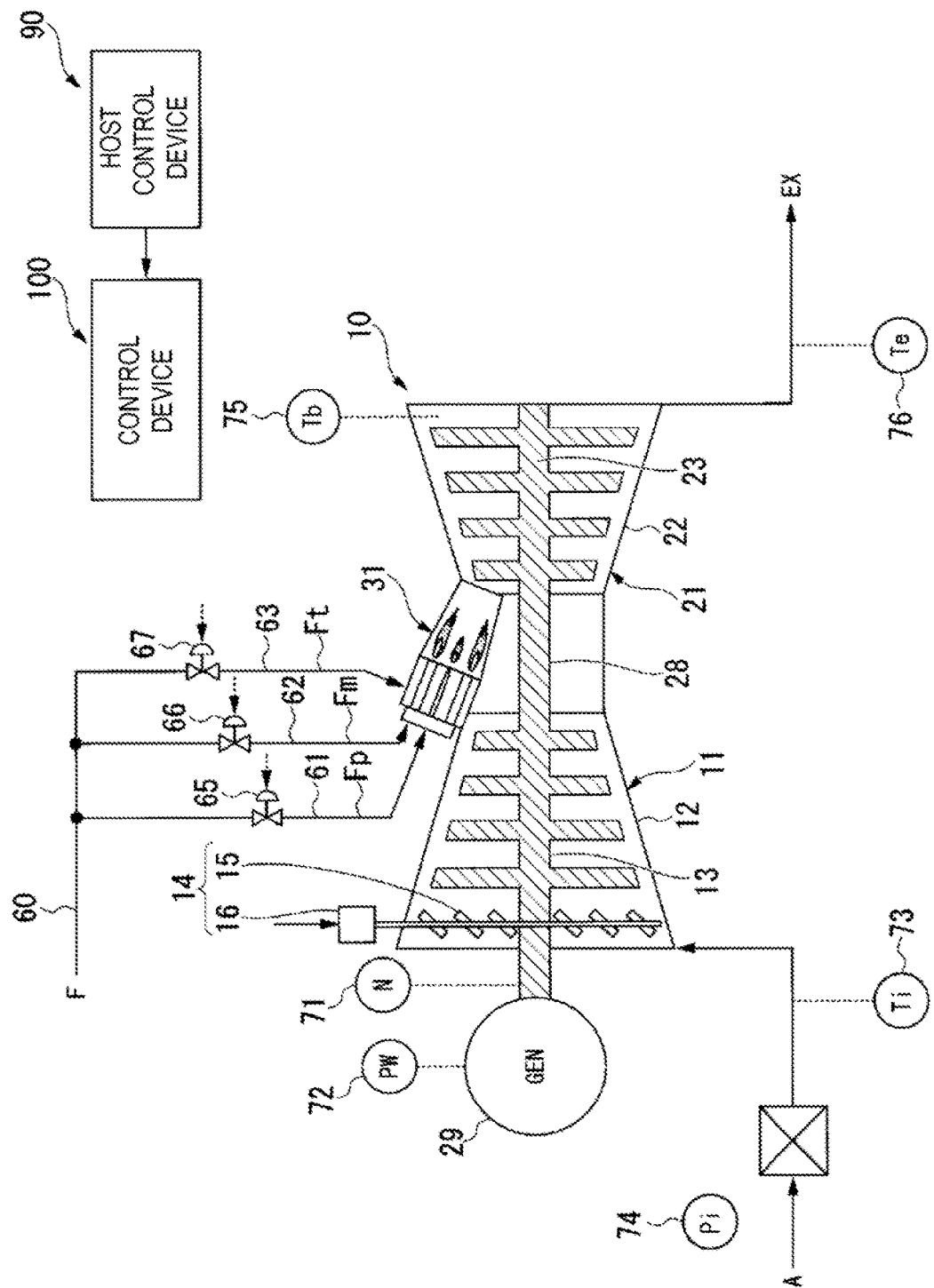
FIG. 1 is a system diagram illustrating a gas turbine plant according to an embodiment of the present invention.

As illustrated in FIG. 1, the gas turbine plant according to the present embodiment includes a gas turbine 10 and a generator 29 that generates electricity by being driven by the gas turbine 10. The gas turbine 10 includes a compressor 11 that compresses air, a combustor 31 that generates a combustion gas by burning a fuel in the air compressed by the compressor 11, and a turbine 21 driven using the high-temperature high-pressure combustion gas.

The compressor 11 has a compressor rotor 13 that rotates around an axis, a compressor casing 12 that covers the compressor rotor 13 while allowing the compressor rotor 13 to rotate, and an inlet guide vane (IGV) 14 provided at an intake port of the compressor casing 12. The IGV 14 has multiple guide vanes 15 and a driver 16 that drives the multiple guide vanes 15, and adjusts a flow volume of the air sucked into the compressor casing 12.

The turbine 21 has a turbine rotor 23 rotated around the axis by the combustion gas from the combustor 31, and a turbine casing 22 that covers the turbine rotor 23 while allowing the turbine rotor 23 to rotate. The turbine rotor 23 and the compressor rotor 13 rotate around the same axis, and are connected to each other to form a gas turbine rotor 28. A rotor of the generator 29 is connected to this gas turbine rotor 28.

Figure 2:
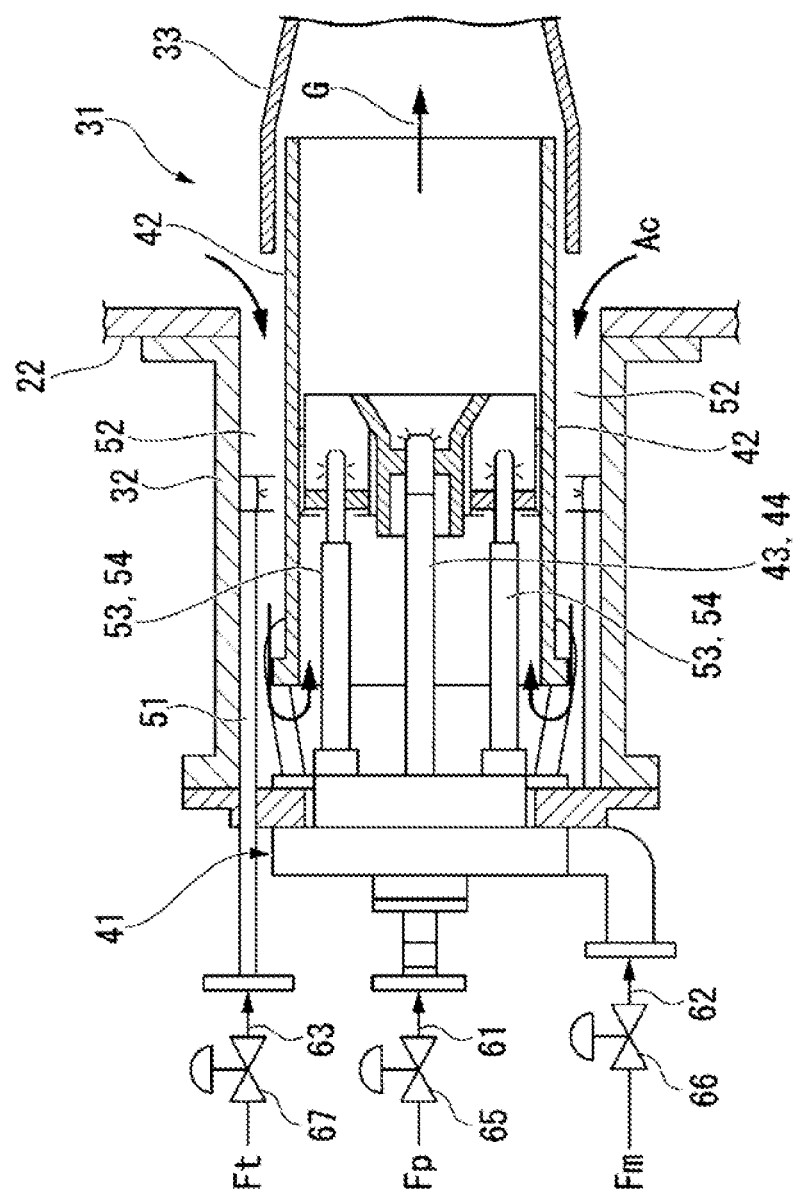
FIG. 2 is a cross-sectional view of a combustor according to the embodiment of the present invention.

As illustrated in FIG. 2, the combustor 31 includes: an external cylinder 32 fixed to the turbine casing 22; a combustion liner (or transition piece) 33, disposed within the turbine casing 22, that delivers the combustion gas into a combustion gas flow channel of the turbine 21; and a fuel supply unit 41 that supplies the fuel and air to the interior of the combustion liner 33.

Figure 3:
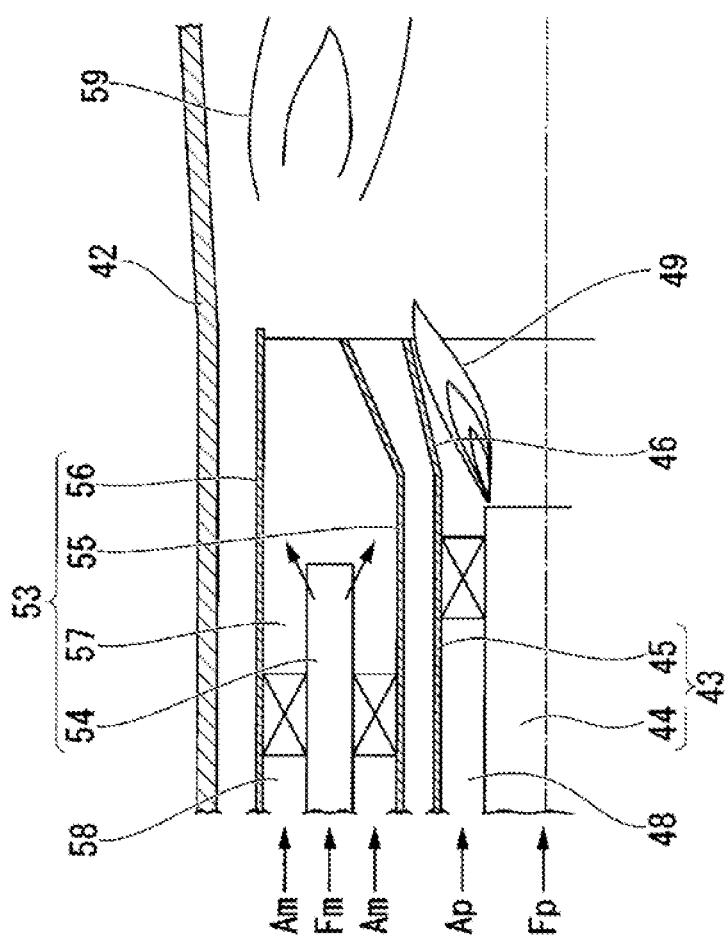
FIG. 3 is a cross-sectional view illustrating the main portion of the combustor according to the embodiment of the present invention.

As illustrated in FIGS. 2 and 3, the fuel supply unit 41 has: a combustor basket 42; a pilot burner 43 disposed on a central axis line of the combustor basket 42; multiple main burners 53 disposed at equal intervals in a circumferential direction around the pilot burner 43; and a top hat nozzle 51 disposed on an inner peripheral side of the external cylinder 32 and an outer peripheral side of the combustor basket 42. Note that in the following, with respect to a direction in which the central axis line of the combustor basket 42 extends, a side toward which a combustion gas G flows in the combustion liner 33 will be called a "downstream side" and the side opposite therefrom will be called an "upstream side".

The pilot burner 43 has a pilot nozzle 44 disposed on the central axis line of the combustor basket 42 and a tubular pilot air tube 45 surrounding the outer periphery of the pilot nozzle 44. A downstream side of the pilot air tube 45 forms a pilot cone 46 whose diameter gradually becomes larger toward the downstream side. The inner peripheral side of the pilot air tube 45 forms a pilot air channel 48 through which compressed air Ac from the compressor flows as pilot air Ap. A pilot fuel Fp sprayed from the pilot nozzle 44 is burned (through diffusion combustion) in the pilot air Ap discharged from the pilot air channel 48 to form a diffusion flame 49.

Each main burner 53 has: a tubular main air internal cylinder 55 surrounding the outer periphery of the pilot air tube 45; a tubular main air external cylinder 56 surrounding the outer periphery of the main air internal cylinder 55; partition plates 57 that divide an annular space between the outer peripheral side of the main air internal cylinder 55 and the inner peripheral side of the main air external cylinder 56 into multiple parts in the circumferential direction; and a main nozzle 54 disposed between the multiple partition plates 57. The multiple spaces defined by the main air internal cylinder 55, the main air external cylinder 56, and the multiple partition plates 57 form a main air channel 58 in which the compressed air Ac from the compressor 11 flows as main air Am. A main fuel Fm is sprayed from the main nozzle 54 disposed within the main air channel 58 into the main air Am flowing in the main air channel 58. As a result, premixed gas, which is a mixture of the main air Am and the main fuel Fm, flows inside the main air channel 58 further on the downstream side than a tip end portion (downstream end) of the main nozzle 54. After flowing out of the main air channel 58, this premixed gas is burned (through premixed combustion) and forms a premixed flame 59. The above-described diffusion flame 49 fulfills a role of stabilizing this premixed flame 59.

A space between the inner peripheral side of the external cylinder 32 and the outer peripheral side of the combustor basket 42 forms a compressed air channel 52 that guides the compressed air Ac from the compressor 1 to the combustor basket 42. The top hat nozzle 51 sprays a top hat fuel Ft into this compressed air channel 52. Thus, when the top hat fuel Ft is sprayed into the compressed air channel 52, the top hat fuel Ft is mixed into the main air Am and the pilot air Ap.

As illustrated in FIGS. 1 and 2, the gas turbine plant according to the present embodiment further includes: a pilot fuel line 61 that delivers the pilot fuel Fp to the pilot nozzle 44; a main fuel line 62 that delivers the main fuel Fm to the main nozzle 54; a top hat fuel line 63 that delivers the top hat fuel Ft to the top hat nozzle 51; a pilot fuel valve 65 that adjusts a flow volume of the pilot fuel Fp; a main fuel valve 66 that adjusts a flow volume of the main fuel Fm; a top hat fuel valve 67 that adjusts a flow volume of the top hat fuel Ft; and a control device 100 that controls operations of the fuel valves 65, 66, 67, and the like.

The pilot fuel line 61, the main fuel line 62, and the top hat fuel line 63 are all lines branching out from a fuel line 60. The pilot fuel valve 65 is provided in the pilot fuel line 61, the main fuel valve 66 is provided in the main fuel line 62, and the top hat fuel valve 67 is provided in the top hat fuel line 63.

As illustrated in FIG. 1, the gas turbine plant according to the present, embodiment further includes: an RPM gauge 71 that detects an RPM N of the gas turbine rotor 28; an output gauge 72 that detects an output PW of the generator 29; an intake temperature gauge 73 that detects an intake temperature Ti, which is a temperature of air A taken into the compressor 11; an intake pressure gauge 74 that detects an intake pressure (atmospheric pressure) Pi, which is a pressure of the air taken into the compressor 11; a blade path temperature gauge 75 that detects a blade path temperature Tb, which is a temperature of the combustion gas immediately after a final stage of the turbine 21; and an exhaust gas temperature gauge 76 that detects a temperature Te of exhaust gas within an exhaust duct downstream from the final stage of the turbine 21.

Figure 4:
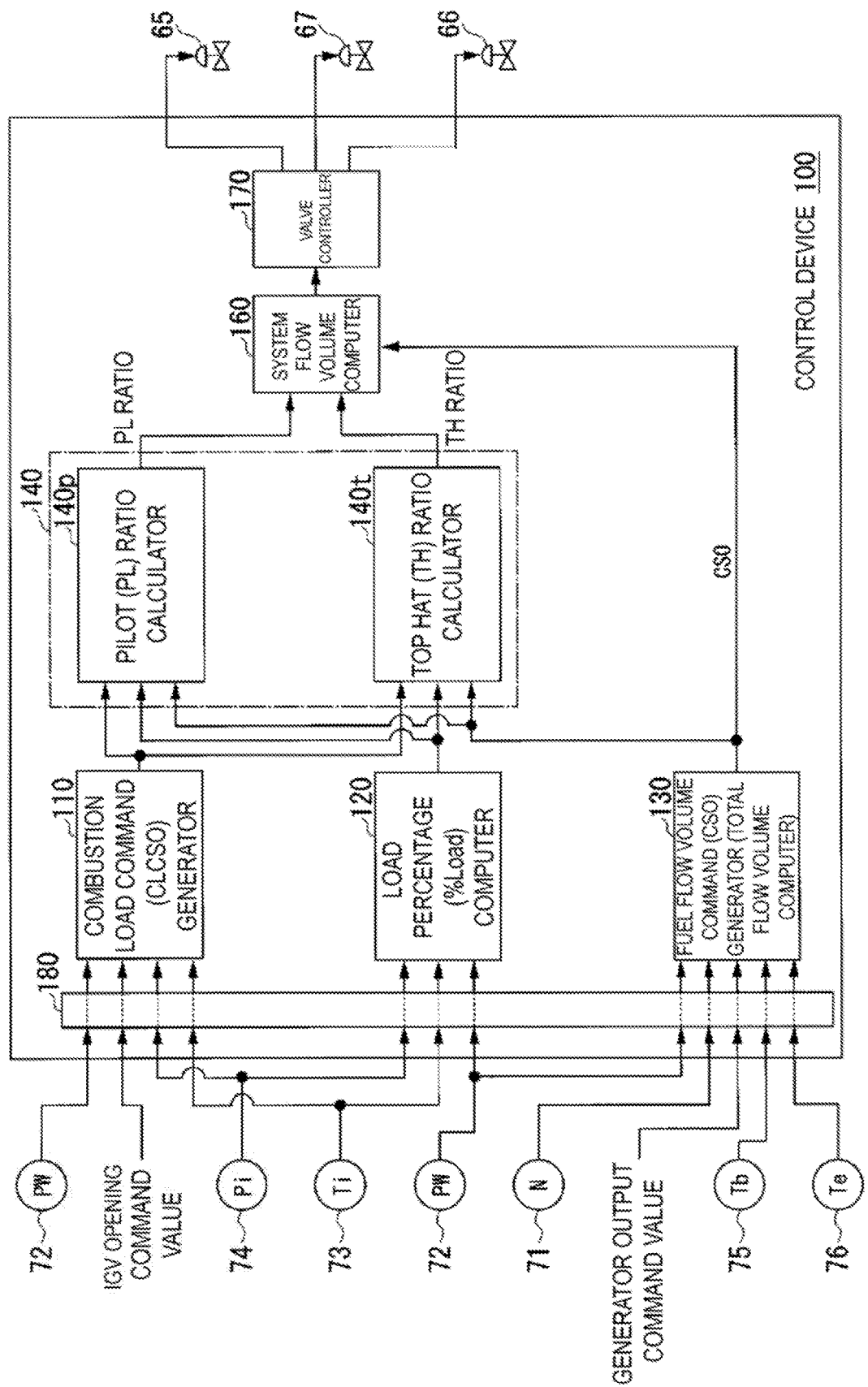
FIG. 4 is a function block diagram illustrating a control device according to the embodiment of the present invention.

As illustrated in FIG. 4, the control device 100 includes: an interface 180 that receives detection values from the detection gauges and the like; a combustion load command generator 110 that generates a combustion load command value CLCSO; a load percentage computer 120 that finds a load percentage % Load of the gas turbine at the present point in time; a fuel flow volume command generator 130 that generates a fuel flow volume command value CSO; a pilot ratio calculator 140p that calculates a pilot ratio (PL ratio), which is a ratio of a pilot fuel flow volume Fpf to a total fuel flow volume; a top hat ratio calculator 140t that calculates a top hat ratio (TH ratio), which is a ratio of a top hat fuel flow volume Ftf to the total fuel flow volume; a system flow volume complier 160 that finds flow volumes in the fuel lines 61, 62, and 63; and a valve controller 170 that outputs control signals to the fuel valves 65, 66, and 67 in accordance with the flow volumes in the fuel lines 61, 62, and 63, respectively. Note that in the present embodiment, the pilot ratio calculator 140p and the top hat ratio calculator 140t constitute a flow ratio calculation device 140.

The combustion load command value CLCSO is a parameter that is an inlet temperature of the combustion gas in the turbine 21 made dimensionless, and is a parameter having a positive correlation with the inlet temperature. The combustion load command value CLCSO is set so as to be 0% when the inlet temperature is at a lower limit value and to be 100% when the inlet temperature is at an upper limit value. For example, when the lower limit value of the inlet temperature is 700° C. and the upper limit value of the inlet temperature is 1,500° C., the combustion load command value CLCSO is expressed by the following formula.

$$CLCSO(\%) = \{(\text{measured value of generator output} - 70°CMW)/(1{,}500°CMW - 700°CMW)\} \times 100$$

Note that 700°CMW is the generator output when the inlet temperature is the lower limit value of 700° C., and 1,500°CMW is the generator output when the inlet temperature is the upper limit value of 1,500° C.

Figure 5:
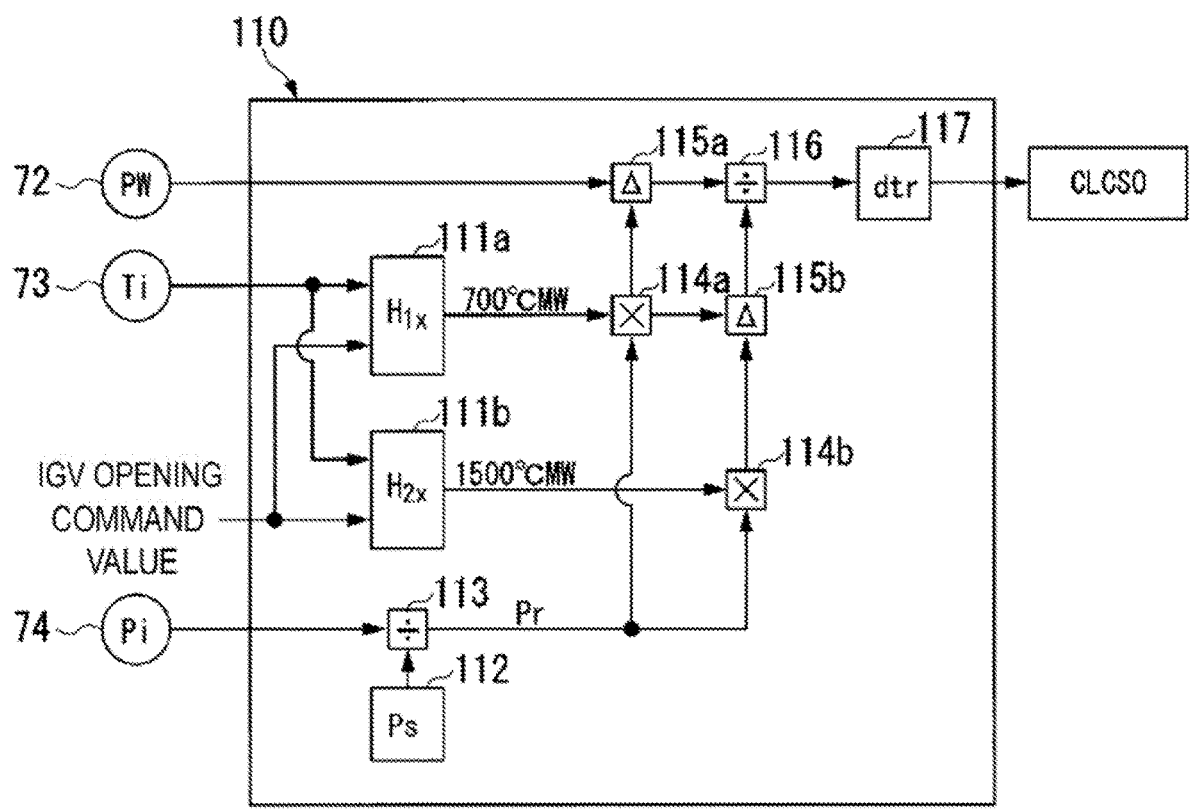
FIG. 5 is a function block diagram illustrating a combustion load command generator according to the embodiment of the present invention.

As illustrated in FIG. 5, the combustion load command generator 110 has: a first output computer 111a that finds the generator output 700°CMW occurring when the inlet temperature is the lower limit value of 700° C.; a second output computer 111b that finds the generator output 1500°CMW occurring when the inlet temperature is the upper limit value of 1,500° C.; a standard atmospheric pressure generator 112 that generates a pre-set standard atmospheric pressure Ps; a first divider 113 that finds an intake pressure ratio Pr, which is a ratio of the intake pressure Pi detected by the intake pressure gauge 74 to the standard atmospheric pressure (standard intake pressure) Ps; a first multiplier 114a that multiplies the generator output 700°CMW, found by the first output computer 111a, by the intake pressure ratio Pr; a second multiplier 114b that multiplies the generator output 1,500°CMW, found by the second output computer 111b, by the intake pressure ratio Pr; a first subtractor 115a that subtracts the multiplication result obtained by the first multiplier 114a from the measured output PW of the generator 29 detected by the output gauge 72; a second subtractor 115b that subtracts the multiplication result obtained by the first multiplier 114a from the multiplication result obtained by the second multiplier 114b; a second divider 116 that divides the subtraction result obtained by the first subtractor 115a by the subtraction result obtained by the second subtractor 115b; and a limiter 117 that limits an increase/decrease rate of the output from the second divider 116.

The first output computer 111a finds the generator output 700°CMW occurring when the inlet temperature is 700° C. using a function $H_1x$, with the intake temperature Ti and an IGV opening command value serving as fluctuating parameters. Meanwhile, the second output computer 111b finds the generator output 7001500°CMW occurring when the inlet temperature is 1,500° C. using a function $H_2x$, with the intake temperature Ti and the IGV opening command value serving as fluctuating parameters. Here, the IGV opening command value is a command value supplied to the driver 16 of the IGV 14 by the control device 100. This IGV opening command value is found, for example, from the atmospheric pressure Pi, which is the pressure at the inlet of the compressor 11, a pressure at the outlet of the compressor 11, and the like. The output computers 111a and 111b change the known values of 700°CMW and 1,500°CMW, respectively, in the case where the intake temperature and the IGV opening command value are reference values to values corresponding to the actual intake temperature Ti and IGV opening command value, and output the post-change values as 700°CMW and 1,500°CMW, respectively.

The 700°CMW and 1,500°CMW are furthermore corrected on the basis of a measured value Pi of the intake pressure (atmospheric pressure). Specifically, the first divider 113 finds the intake pressure ratio Pr, which is a ratio of the intake pressure (atmospheric pressure) Pi detected by the intake pressure gauge 74, to the standard intake pressure (standard atmospheric pressure) Ps from the standard atmospheric pressure generator 112. The first multiplier 114a multiplies the 700°CMW from the first output computer 111a by the intake pressure ratio Pr and corrects the 700°CMW to a value corresponding to the intake pressure ratio Pr. The second multiplier 114b multiplies the 1,500°CMW from the second output computer 111b by the intake pressure ratio Pr and corrects the 1,500°CMW to a value corresponding to the intake pressure ratio Pr. In other words, through the foregoing, the known values of 700°CMW and 1,500°CMW in the case where the intake temperature and the IGV opening command value are reference values are corrected to values corresponding to the measured intake temperature Ti, the IGV opening command value, and the measured intake pressure ratio Pr.

The first subtractor 115a subtracts the 700°CMW corrected with the intake pressure ratio Pr from the measured output PW of the generator 29 detected by the output gauge 72. In other words, the first subtractor 115a finds the value of the numerator in the above formula. The second subtractor 15b subtracts the 700°CMW corrected, with the intake pressure ratio Pr from the 1,500°CMW corrected with the intake pressure ratio Pr. In other words, the second subtractor 115b finds the value of the denominator in the above formula.

The second divider 116 divides the value of the numerator in the above formula, found by the first subtractor 115a, by the value of the denominator in the above formula, found by the second subtractor 115b, and outputs the resulting value as the combustion load command value. The limiter 117 limits the increase/decrease rate of the combustion load command value, which is an amount of change in the combustion load command value from the second divider 116 per unit time, so that the increase/decrease rate is less than or equal to a predetermined value.

Although the foregoing describes the lower limit value of the inlet temperature of the combustion gas in the turbine 21 as being 700° C. and the upper limit value of the same being 1,500° C., depending on the model type of the combustor 31 and the like, the lower limit value and upper limit value of the inlet temperature of the combustion gas in the turbine 21 may be set to different values from those in the above example.

The combustion load command value CLCSO, with the increase/decrease rate thereof limited by the limiter 117, is outputted from the combustion load command generator 110.

Figure 6:
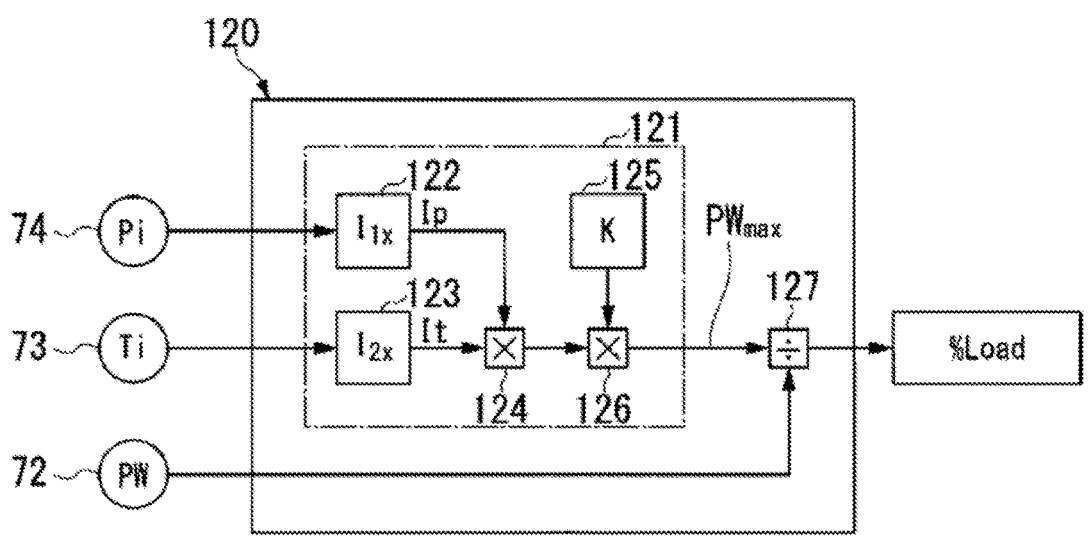
FIG. 6 is a function block diagram illustrating a load percentage computer according to the embodiment of the present invention.

The load percentage % Load of the gas turbine 10 is a percentage of a current load PW relative to a maximum load PWmax permitted in the state of the gas turbine 10 at the present point in time. As illustrated in FIG. 6, the load percentage computer 120 has a maximum load computer 121 that finds the maximum load PWmax permitted in the state of the gas turbine 10 at the present point in time, and a divider 127 that divides the measured load PW, which is the output of the generator 29 detected by the output gauge 72, by the maximum load PWmax.

The maximum load computer 121 has: a first load coefficient computer 122 that finds a maximum load coefficient Ip based on the intake pressure Pi; a second load coefficient computer 123 that finds a maximum load coefficient It based on the intake temperature Ti; a first multiplier 124 that multiplies the maximum load coefficient Ip by the maximum load coefficient It; a degradation coefficient generator 125 that generates a degradation coefficient K based on an operating time of the gas turbine 10; and a second multiplier 126 that multiplies the multiplication result from the first multiplier 124 by the degradation coefficient K. In other words, the maximum load computer 121 finds the maximum load PWmax based on the measured intake pressure Pi detected by the intake pressure gauge 74, the measured intake temperature Ti detected by the intake temperature gauge 73, and the degradation coefficient K the gas turbine 10. As described earlier, the divider 127 divides the measured load PW, which is the output of the generator 29 detected by the output gauge 72, by the maximum load PWmax, and outputs the result as the load percentage % Load.

The fuel flow volume command value CSO is a value specifying a total flow volume of the fuels supplied to the combustor 31 ("total fuel flow volume" hereinafter). As such, the fuel flow volume command generator 130 functions as a total flow volume computer. Therefore, the fuel flow volume command generator 130 executes a total fuel flow volume computation process of finding the total fuel flow volume.

Figure 7:
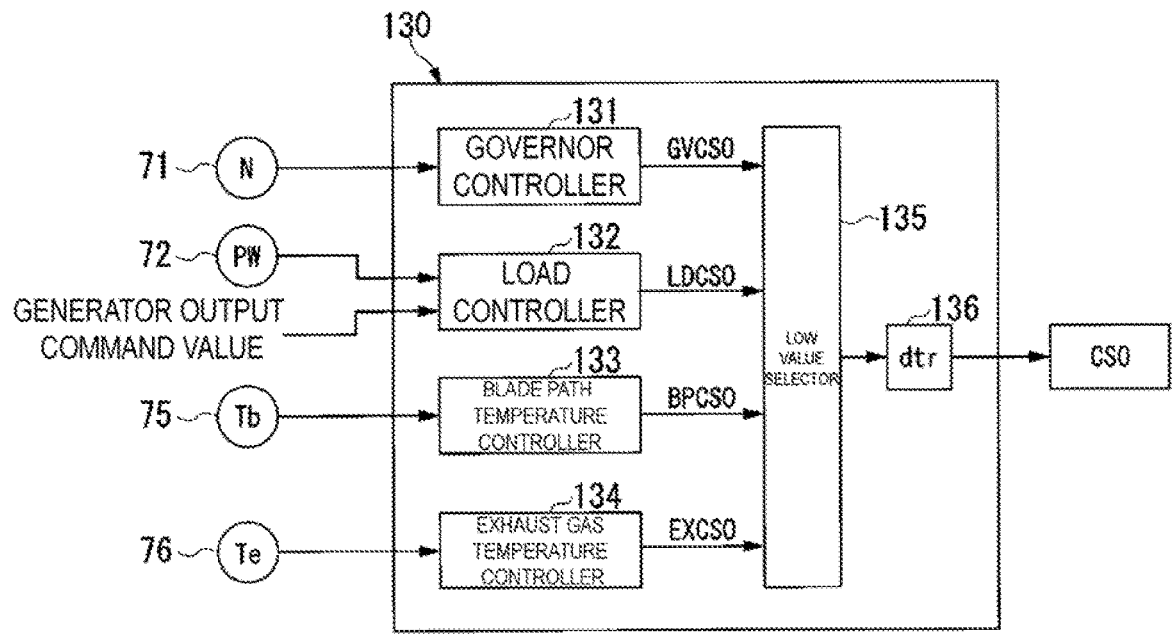
FIG. 7 is a function block diagram illustrating a fuel flow volume command generator according to the embodiment of the present invention.

As illustrated in FIG. 7, the fuel flow volume command generator 130 has: a governor controller 131 that outputs a command value for controlling the total fuel flow volume so that the RPM N of the gas turbine rotor 28 becomes a target RPM; a load controller 132 that outputs a command value for controlling the total fuel flow volume so that the generator output PW matches a generator output command value; a first temperature controller 133 that outputs a command value, for controlling the total fuel flow volume so that the blade path temperature Tb of the gas turbine does not exceed an upper limit value; a second temperature controller 134 that outputs a command value for controlling the total fuel flow volume so that the exhaust gas temperature Te does not exceed an upper limit value; a low value selector 135 that outputs the lowest command value among the command values from the controllers 131 to 134; and a limiter 136 that limits an increase/decrease rate of the command from the low value selector 135.

The governor controller 131 receives the RPM N of the gas turbine rotor 28 from the RPM gauge 71 and outputs a command value GVCSO for controlling the total fuel flow volume so that the RPM N of the gas turbine rotor 28 matches the target RPM. Specifically, the governor controller 131 compares the measured RPM N of the gas turbine rotor 28 with a pre-set GV setting value, and outputs a proportional control signal as the command value GVCSO.

The load controller 132 receives the measured output PW of the generator 29 from the output gauge 72, and the generator output command value from a host control device 90 (see FIG. 1). The load controller 132 outputs a command value LDCSO for controlling the total fuel flow volume so that the measured output PW matches the generator output command value. Specifically, the load controller 132 compares the measured output PW with the generator output command value, computes a proportional integral, and outputs the result thereof as the command value LDCSO.

The first temperature controller 133 receives the blade path temperature Tb from the blade path temperature gauge 75, and outputs a command value BPSCPO for controlling the total fuel flow volume so that the blade path temperature Tb does not exceed the upper limit value. Specifically, the first temperature controller 133 compares the measured blade path temperature Tb with the upper limit value thereof, computes a proportional integral, and outputs the result thereof as the command value BPCSO.

The second temperature controller 134 receives the exhaust gas temperature Te from the exhaust gas temperature gauge 76, and outputs a command value EXCSO for controlling the total fuel flow volume so that the exhaust gas temperature Te does not exceed the upper limit value. Specifically, the second temperature controller 134 compares the measured exhaust gas temperature Te with the upper limit value thereof, computes a proportional integral, and outputs the result thereof as the command value EXCSO.

The low value selector 135 selects the lowest command value among the command values from the controllers 131 to 134 and outputs the selected command value. The limiter 136 limits the increase/decrease rate of the command from the low value selector 135, and outputs the result as the fuel flow volume command value (total fuel flow volume command value) CSO.

Figure 9:
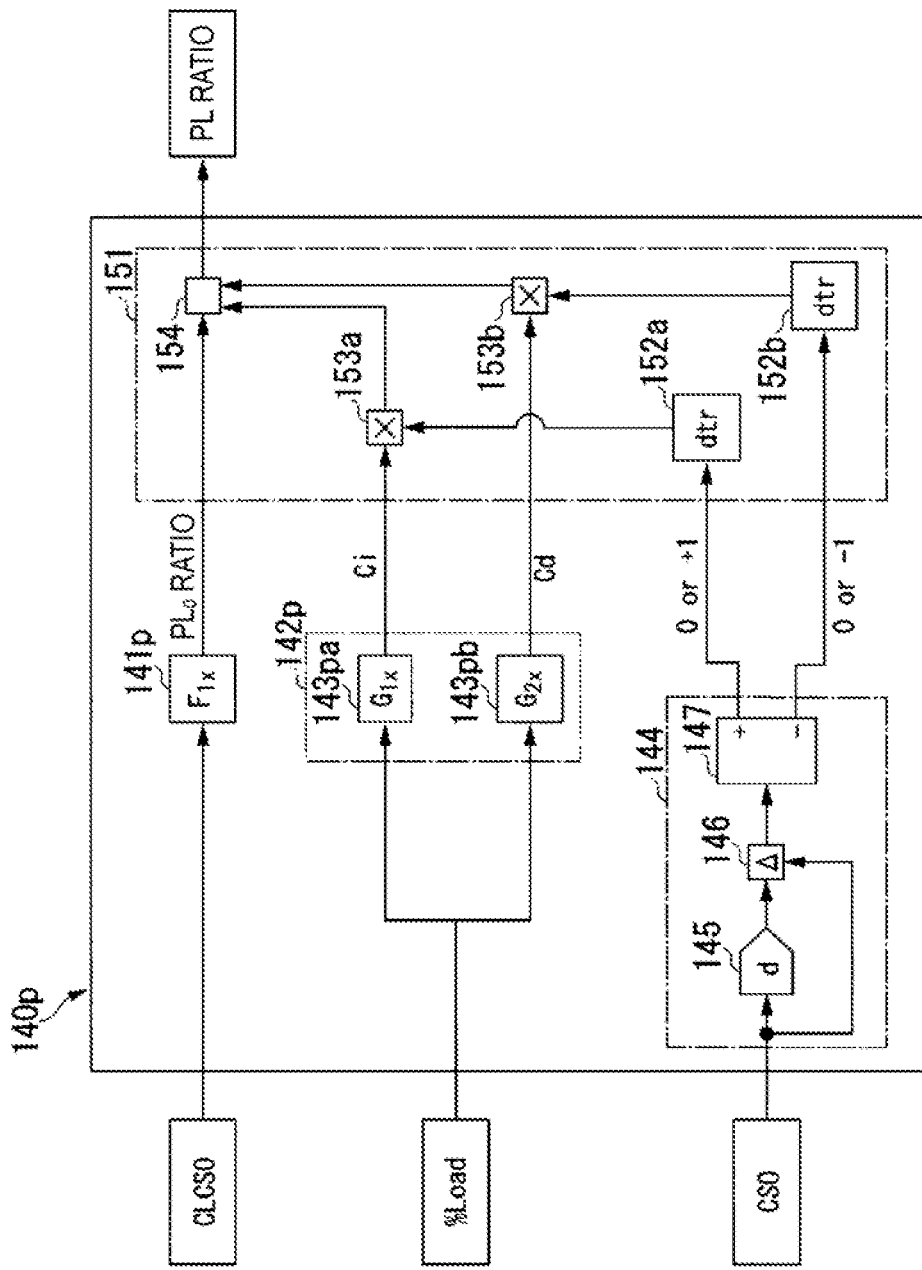
FIG. 9 is a function block diagram illustrating a pilot ratio calculator according to the embodiment of the present invention.

The pilot ratio (PL ratio) is a ratio of the pilot fuel flow volume Fpf to the total fuel flow volume. As illustrated in FIG. 9, the pilot ratio calculator 140$p$ has: a $PL_0$ ratio computer (flow volume ratio computer) 141$p$ that finds the $PL_0$ ratio, which is the pilot ratio based on the combustion load command value CLCSO; a correction value computer 142$p$ that calculates a correction value based on the load percentage % Load; a fluctuation sensor 144 that senses a fluctuation in the fuel flow volume command value CSO; and a corrector 151 that corrects the $PL_0$ ratio with the correction value.

Figure 11:
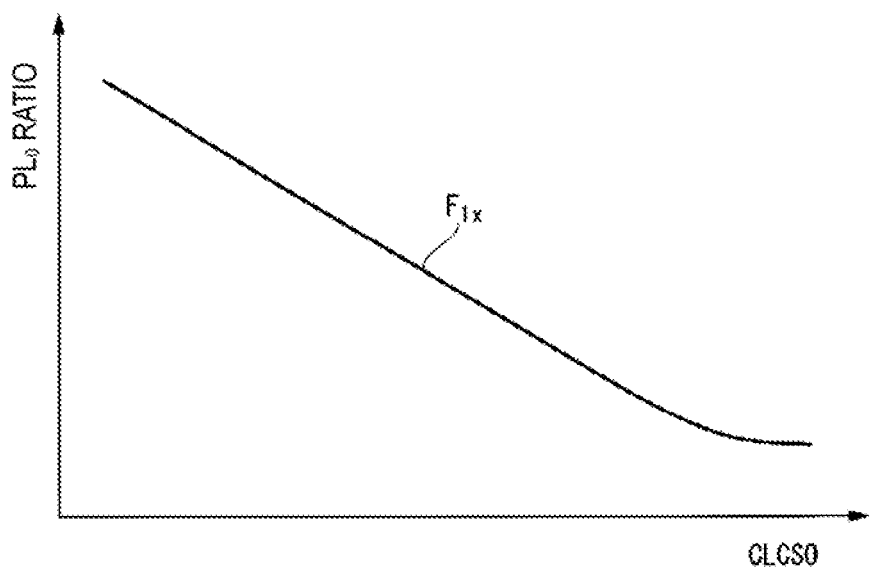
FIG. 11 is a graph illustrating a relationship between a pre-correction pilot ratio ($PL_O$ ratio) and a combustion load command value CLCSO according to the embodiment of the present invention.

The ratio computer 141$p$ has a function $F_1x$ defining a relationship between the combustion load command value CLCSO, which has a positive correlation with the inlet temperature of the combustion gas in the turbine 21, and the $PL_0$ ratio. As illustrated in FIG. 11, the function $F_1x$ is a function in which the $PL_0$ ratio gradually decreases as the combustion load command value CLCSO increases, or in other words, as the inlet temperature of the combustion gas rises. The $PL_0$ ratio computer 141$p$ receives the combustion load command value CLCSO from the combustion load command generator 110, and finds the $PL_0$ ratio corresponding to that combustion load command value CLCSO using the function $F_1x$. Although the relationship between the combustion load command value CLCSO and the $PL_0$ ratio is defined by the function $F_1x$ here, the relationship may be defined by a map instead.

Figure 12:
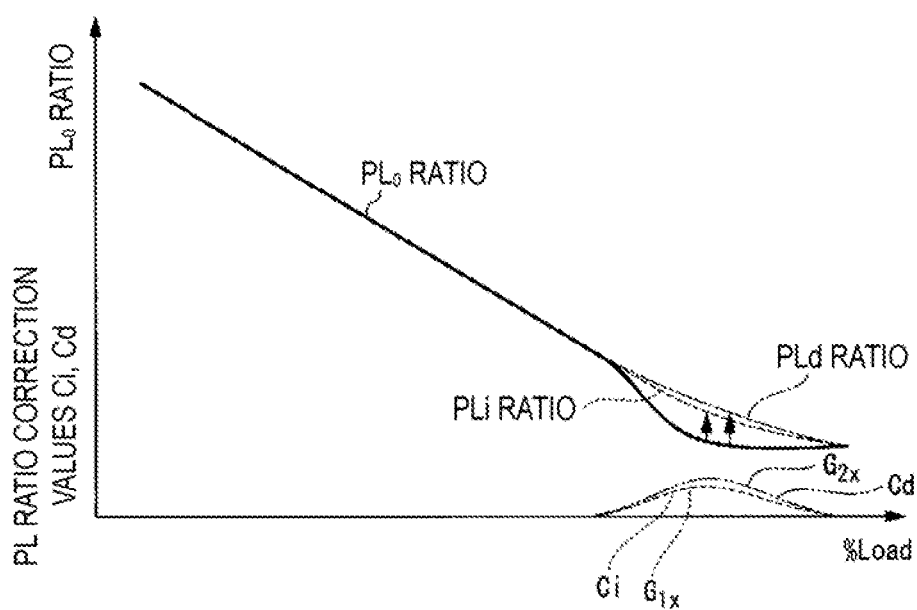
FIG. 12 is a graph illustrating a relationship between the pre-correction pilot ratio ($PL_O$ ratio) and a load percentage % Load, and a relationship between pilot ratio correction values Ci and Cd and the load percentage % Load, according to the embodiment of the present invention.

The correction value computer 142$p$ has an increase time correction value computer 143$pa$ that finds an increase time correction value Ci for when the fuel flow volume command value CSO is increasing, and a decrease time correction value computer 143pb that finds a decrease time correction value Cd for when the fuel flow volume command value CSO is decreasing. As indicated in FIG. 12, the increase time correction value computer 143pa has a function $G_1x$ defining a relationship between the load percentage % Load and the increase time correction value Ci, and finds the increase time correction value Ci based on the current load percentage % Load. Meanwhile, the decrease time correction value computer 143pb has a function $G_2x$ defining a relationship between the load percentage % Load and the decrease time correction value Cd, and finds the decrease time correction value Cd based on the current load percentage % Load.

As illustrated in FIG. 12, the $PL_0$ ratio decreases as the load percentage % Load increases. There is a trend toward further reducing the $PL_0$ ratio particularly in cases where the load percentage % Load is a high load percentage, such as 60% or more, in order to achieve a reduction in NOx. As such, the conditions for burning the fuel in the combustor 31 in a stable manner are stricter in cases of a high load percentage. Both the increase time correction value Ci and the decrease time correction value Cd are correction values for correcting the $PL_0$ ratio and increasing the PL ratio in such cases of a high load percentage. Here, the decrease time correction value Cd is set to be greater than the increase time correction value Ci at the same load percentage % Load.

As described earlier, the combustion load command value CLCSO is a parameter having a positive correlation with the inlet temperature of the combustion gas in the turbine 21. As such, the combustion load command value CLCSO is a higher value when the inlet temperature is high and is a lower value when the inlet temperature is low. Incidentally, even if the inlet temperature of the combustion gas in the turbine 21 has risen in response to the flow volume of fuel to the combustor 31 being increased, the generator output does not increase immediately. Likewise, even if the inlet temperature of the combustion gas in the turbine 21 has fallen in response to the flow volume of fuel to the combustor 31 being reduced, the generator output does not decrease immediately. In other words, even if the inlet temperature of the combustion gas in the turbine 21 has changed in response to the flow volume of fuel to the combustor 31 being increased or reduced, the generator output does not change immediately. Accordingly, in the case where the flow volume of fuel to the combustor 31 has been increased or reduced, the combustion load command value CLCSO found using the measured generator output PW does not immediately become a value that corresponds to the inlet temperature of the combustion gas in the turbine 21.

Accordingly, in the case where the flow volume of fuel to the combustor 31 has been increased or reduced during a high load percentage, which represents conditions not conducive to the stable combustion of fuel, there is a risk that the combustion within the combustor 31 will become unstable at the $PL_0$ ratio determined on the basis of the combustion load command value CLCSO. Accordingly, in the present embodiment, the $PL_0$ ratio is corrected using the increase time correction value Ci and the decrease time correction value Cd in the case where the flow volume of fuel to the combustor 31 is increased or reduced during a high load percentage. There is a particularly strong tendency for the combustion in the combustor 31 to become unstable in the case where the flow volume of fuel to the combustor 31 is reduced, and thus in the present embodiment, the $PL_0$ ratio is corrected using the decrease time correction value Cd, which is a higher value than the increase time correction value Ci. As a result, a post-correction PLd ratio for times of fuel reduction is, as described earlier, a higher value than a post-correction PLi ratio for times of fuel increase.

The increase time correction value computer 143pa and the decrease time correction value computer 143pb both receive the load percentage % Load from the load percentage computer 120. The increase time correction value computer 143pa finds the increase time correction value Ci based on this load percentage % Load using the function $G_1x$. Meanwhile, the decrease time correction value computer 143pb finds the decrease time correction value Cd based on this load percentage % Load using the function $G_2x$.

The fluctuation sensor 144 has: a delay unit 145 that outputs the fuel flow volume command value CSO from the fuel flow volume command generator 130 after a predetermined amount of time; a subtractor 146 that finds a difference between the fuel flow volume command value CSO from the fuel flow volume command generator 130 and the fuel flow volume command value CSO from the delay unit 145; and an increase/decrease determiner 147 that determines whether the fuel flow volume command value CSO is increasing by not less than a predetermined value or decreasing by not less than a predetermined value on the basis of the subtraction result. In the case where the subtraction result from the subtractor 146 is a positive value and the value is not less than the predetermined value, the increase/decrease determiner 147 outputs "+1", which indicates an increase. In the case where the subtraction result from the subtractor is a negative value and the value is not greater than the predetermined value, the increase/decrease determiner 147 outputs "−1", which indicates a decrease. In other cases, the increase/decrease determiner 147 outputs "0", which indicates that there is no increase or decrease.

The corrector 151 has: an increase time coefficient generator 152a that outputs a limiting coefficient limiting an increase/decrease rate of the increase time correction value Ci; a decrease time coefficient generator 152a that outputs a limiting coefficient limiting an increase/decrease rate of the decrease time correction value Cd; a first multiplier 153a that multiplies the increase time correction value Ci by the limiting coefficient; a second multiplier 153b that multiplies the decrease time correction value Cd by the limiting coefficient; and an adder (flow volume ratio corrector) 154 that adds the increase time correction value Ci or decrease time correction value Cd, whose increase/decrease rate has been limited, to the $PL_0$ ratio. In the present embodiment, a $PL_0$ ratio in the case where the flow volume of fuel to the combustor 31 has been increased or decreased during a high load percentage is corrected by adding the increase time correction value Ci or decrease time correction value Cd, whose increase/decrease rate has been limited, to the $PL_0$ ratio determined on the basis of the combustion load command value CLCSO in this manner. The addition result from the adder 154 is outputted from the pilot ratio calculator 140p as a corrected PL ratio.

Note that in the present embodiment, the increase time coefficient generator 152a and the first multiplier 153a constitute a correction value adjuster that changes the correction value to be outputted so as to be closer to the increase time correction value Ci, found by the increase time correction value computer 143pa, with the passage of time. Additionally, in the present embodiment, the decrease time coefficient generator 152b and the second multiplier 153b constitute a correction value adjuster that changes the correction value to be outputted so as to be closer to the decrease time correction value Cd, found by the decrease time correction value computer 143pb, with the passage of time.

Operations of the pilot ratio calculator 140p described thus far will be described in accordance with the flowchart illustrated in FIG. 15.

The $PL_0$ ratio computer (flow volume ratio computer) 141p of the pilot ratio calculator 140p finds the $PL_0$ ratio corresponding to the combustion load command CLCSO using the function $F_1x$ (S1: a flow volume ratio computation process).

The correction value computer 142p of the pilot ratio calculator 140p finds the correction values Ci and Cd based on the load percentage % Load (S2: a correction value computation process). Specifically, as described earlier, the increase time correction value computer 143pa of the correction value computer 142p finds the increase time correction value Ci based on the current load percentage % Load using the function $G_1x$ (S2a: an increase time correction value computation process). Meanwhile, the decrease time correction value computer 143pb finds the decrease time correction value Cd based on the current load percentage % Load using the function $G_2x$ (S2b; a decrease time correction value computation process).

The fluctuation sensor 144 of the pilot ratio calculator 140p outputs "+1", which indicates an increase, in the case where an amount by which the fuel flow volume command value CSO increases per unit time is not less than the predetermined value, and outputs "−1", which indicates a decrease, in the case where an amount by which the fuel flow volume command value CSO decreases per unit time is not less than the predetermined value. In other cases, the fluctuation sensor 144 outputs "0", indicating that the fuel flow volume command value CSO is not increasing or decreasing per unit time (S3: a fluctuation sensing process).

Upon the fluctuation sensor 144 outputting "+1", which indicates that the fuel flow volume command value CSO is increasing, or outputting "−1", which indicates that the fuel flow volume command value CSO is decreasing, the corrector 151 corrects the $PL_0$ ratio found by the $PL_0$ ratio computer 141p using the correction value Ci or correction value Cd found by the correction value computer 142p (S4: a correction process). Specifically, upon the fluctuation sensor 144 outputting "+1", which indicates that the fuel flow volume command value CSO is increasing, the increase time coefficient generator 152a of the corrector 151 outputs the limiting coefficient limiting the increase/decrease rate of the increase time correction value Ci. Upon receiving this limiting coefficient, the first multiplier 153a of the corrector 151 multiplies the increase time correction value Ci from the increase time coefficient generator 152a by this limiting coefficient and outputs the increase time correction value Ci whose increase/decrease rate has been limited. The adder 154 adds the increase time correction value Ci, whose increase/decrease rate has been limited, to the $PL_0$ ratio from the $PL_0$ ratio computer 141p, and outputs the result as the corrected PLi ratio (see FIG. 12) (S4a, an increase time correction process). Meanwhile, upon the fluctuation sensor 144 outputting "−1", which indicates that the fuel flow volume command value CSO is decreasing, the decrease time coefficient generator 152b outputs the limiting coefficient limiting the increase/decrease rate of the decrease time correction value Cd. Upon receiving this limiting coefficient, the second multiplier 153b multiplies the decrease time correction value Cd from the decrease time coefficient generator 152b by this limiting coefficient and outputs the decrease time correction value Cd whose increase/decrease rate has been limited. The adder 154 adds the decrease time correction value Cd, whose increase/decrease rate has been limited, to the $PL_0$ ratio from the $PL_0$ ratio computer 141p, and outputs the result as the corrected PLd ratio (see FIG. 12) (S4b: a decrease time correction process).

Note that when the fluctuation sensor 144 has outputted "0", the outputs from the first multiplier 153a and the second multiplier 153b become "0", and thus the corrector 151 does not correct the $PL^0$ ratio from the $PL_0$ ratio computer 141p, and outputs the $PL_0$ ratio as the PL ratio. Additionally, in the case where the load percentage % Load is not a high load percentage, "0" is outputted from the correction value computer 142p as the correction value, and thus the outputs from the first multiplier 153a and the second multiplier 153b also become "0". Accordingly, even in the case where the load percentage % Load is not a high load percentage, the $PL_0$ ratio from the $PL_0$ ratio computer 141p is not corrected, and the $PL_0$ ratio is outputted as the PL ratio. In other words, the corrector 151 corrects the $PL_0$ ratio from the $PL_0$ ratio computer 141p only in the case where the load percentage % Load is a high load percentage and the fuel flow volume command value CSO has increased or decreased by not fess than a predetermined amount.

Figure 15:
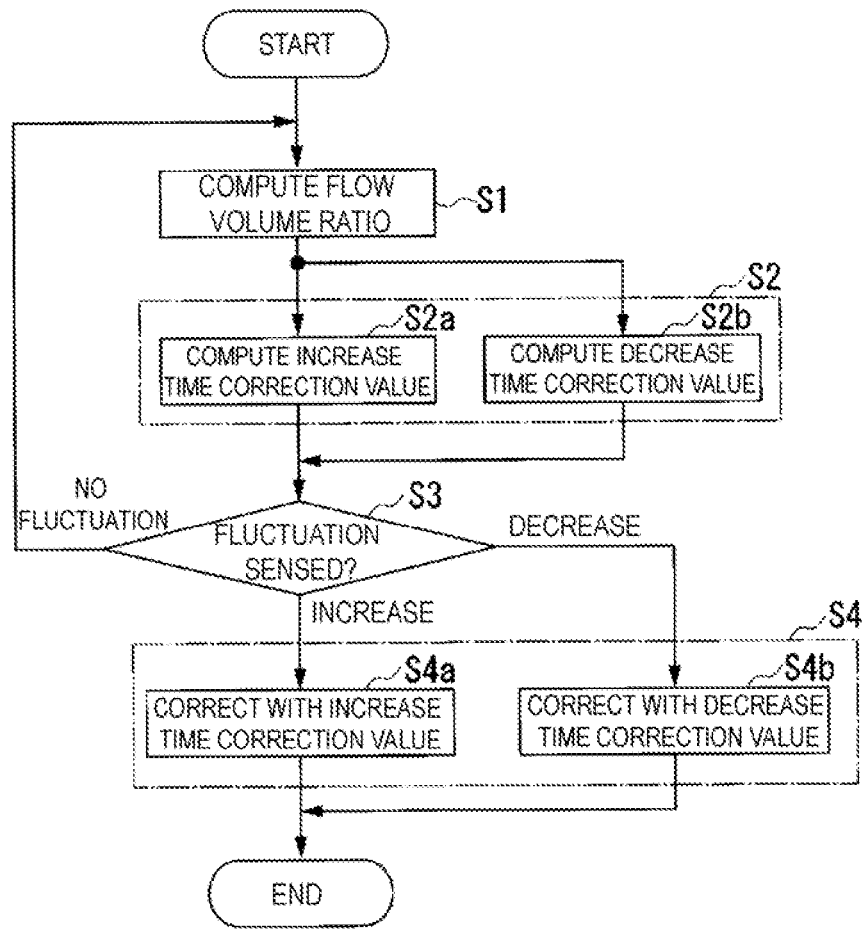
FIG. 15 is a flowchart illustrating operations of the pilot ratio calculator according to the embodiment of the present invention.

Although the flowchart illustrated in FIG. 15 illustrates the correction value computation process (S2) as being executed after the flow volume ratio computation process (S1) is executed, and the fluctuation sensing process (S3) being executed thereafter, the flow volume ratio computation process (S1), the correction value computation process (S2), and the fluctuation sensing process (S3) are actually executed in parallel.

Figure 10:
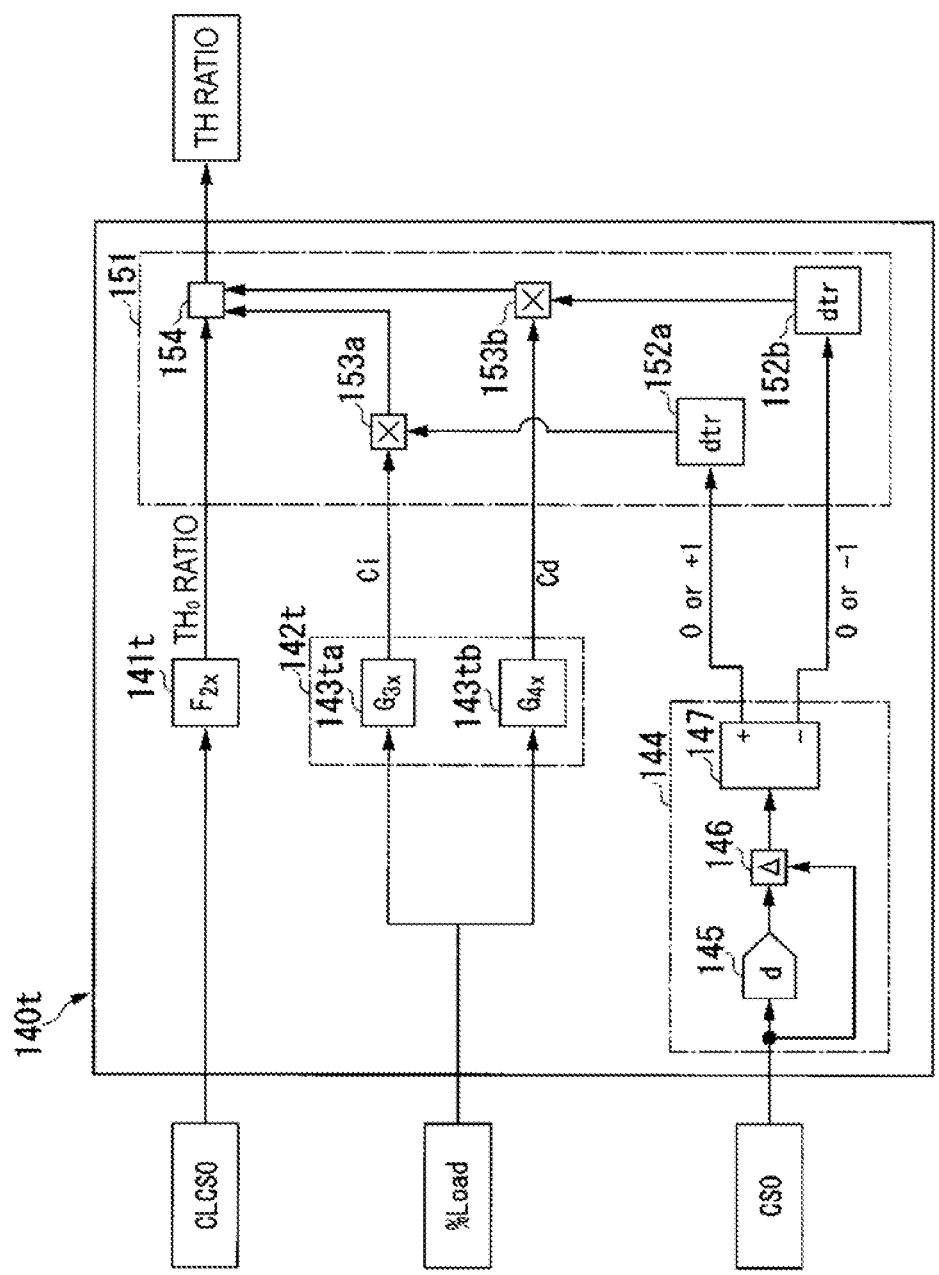
FIG. 10 is a function block diagram illustrating a top hat ratio calculator according to the embodiment of the present invention.

The top hat ratio (TH ratio) is a ratio of the top hat fuel flow volume Ftf to the total fuel flow volume. As illustrated in FIG. 10, the top hat ratio calculator 140t has: a $TH_0$ ratio computer (flow volume ratio computer) 141t that finds the $TH_0$ ratio, which is the top hat ratio based on the combustion load command value CLCSO; a correction value computer 142t that calculates a correction value based on the load percentage % Load; a fluctuation sensor 144 that senses a fluctuation in the fuel flow volume command value CSO; and a corrector 151 that corrects the $TH_0$ ratio with a correction value.

Figure 13:
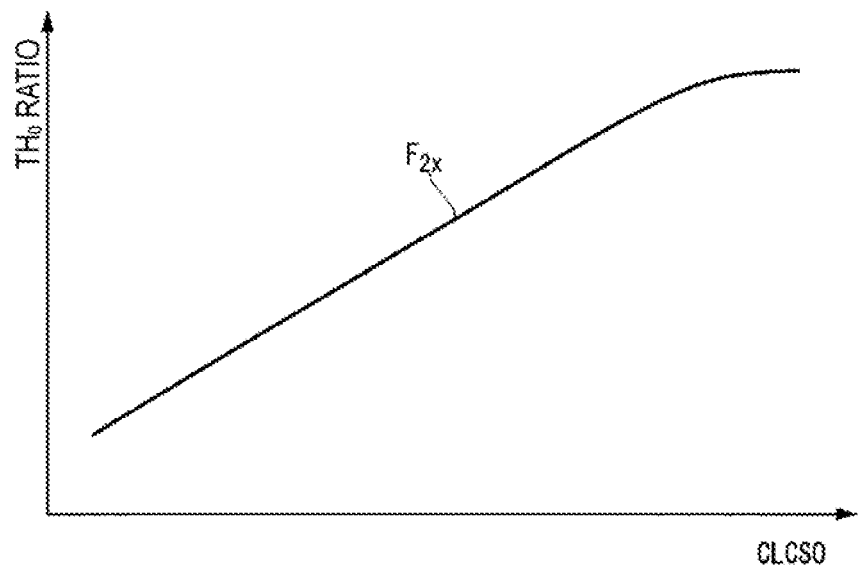
FIG. 13 is a graph illustrating a relationship between a pre-correction top hat ratio ($TH_O$ ratio) and the combustion load command value CLCSO according to the embodiment of the present invention.

The $TH_0$ ratio computer 141t has a function $F_2x$ defining a relationship between the combustion load command value CLCSO and the $TH_0$ ratio. As illustrated in FIG. 13, the function $F_2x$ is a function in which the $TH_0$ ratio gradually increases as the combustion load command value CLCSO increases, or in other words, as the inlet temperature of the combustion gas rises. The $TH_0$ ratio computer 141t receives the combustion load command value CLCSO from the combustion load command generator 110, and finds the $TH_0$ ratio corresponding to that combustion load command value CLCSO using the function $F_2x$. Although the relationship between the combustion load command value CLCSO and the $TH_0$ ratio is defined by the function $F_2x$ here, the relationship may be defined by a map instead.

Figure 14:
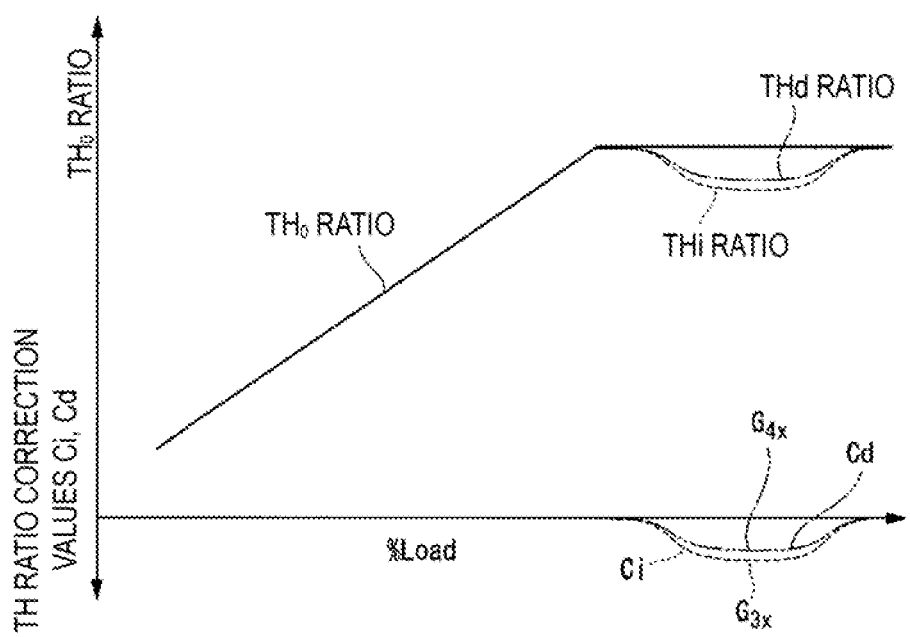
FIG. 14 is a graph illustrating a relationship between a pre-correction top hat ratio ($TH_O$ ratio) and the load percentage % Load, and a relationship between top hat ratio correction values Ci and Cd and the load percentage % Load, according to the embodiment of the present invention.

The correction value computer 142t has an increase time correction value computer 143ta that finds an increase time correction value Ci for when the fuel flow volume command value CSO is increasing, and a decrease time correction value computer 143tb that finds a decrease time correction value Cd for when the fuel flow volume command value CSO is decreasing. As indicated in FIG. 14, the increase time correction value computer 143ta has a function $G_3x$ defining a relationship between the load percentage % Load and the increase time correction value Ci, and finds the increase time correction value Ci based on the current load percentage % Load. Meanwhile, the decrease time correction value computer 143tb has a function $G_4x$ defining a relationship between the load percentage % Load and the decrease time correction value Cd, and finds the decrease time correction value Cd based on the current load percentage % Load. The increase time correction value Ci and the decrease time correction value Cd are both negative values. Here, the decrease time correction value Cd is set to be greater than the increase time correction value Ci at the same load percentage % Load. To rephrase, an absolute value of the decrease time correction value Cd is set to be lower than an absolute value of the increase time correction value Ci at the same load percentage % Load.

As illustrated in FIG. 14, the $TH_0$ ratio basically increases as the load percentage % Load increases. However, here, in the case where the load percentage % Load is a high load percentage such as 60% or higher, the $TH_0$ ratio is substantially constant even if the load percentage % Load increases.

In combustors, depending on the structure of the combustor, the properties of the fuel fed to the combustor, and the like, there is a strong tendency for combustion oscillation to occur at load percentages arising with such structures and the like. With the combustor 31 according to the present embodiment, the tendency for combustion oscillation to occur becomes stronger at high load percentages. With the combustor 31 according to the present embodiment, combustion oscillation can be suppressed by reducing the TH ratio during such high load percentages and when the fuel flow volume command value CSO is increasing or decreasing. Accordingly, the increase time correction value Ci and the decrease time correction value Cd for the $TH_0$ ratio of the present embodiment are both negative correction values that reduce the post-correction TH ratio in the case of a high load percentage.

The fluctuation sensor 144 has the same configuration as the fluctuation sensor 144 of the pilot ratio calculator 140p. Accordingly, this fluctuation sensor 144 outputs "+1", which indicates an increase, in the case where an amount by which the fuel flow volume command value CSO increases per unit time is not less than a predetermined value, and outputs "-1", which indicates a decrease, in the case where an amount by which the fuel flow volume command value CSO decreases per unit time is not less than a predetermined value. In other cases, the fluctuation sensor 144 outputs "0", indicating that the fuel flow volume command value CSO is not increasing or decreasing per unit time.

The corrector 151 has the same configuration as the corrector 151 of the pilot ratio calculator 140p. Accordingly, upon the fluctuation sensor 144 outputting "-1", which indicates that the fuel flow volume command value CSO is increasing, or outputting "-1", which indicates that the fuel flow volume command value CSO is decreasing, the corrector 151 corrects the $TH_0$ ratio found by the $TH_0$ ratio computer 141t using the correction value Ci or the correction value Cd found by the correction value computer 142t.

Operations of the top hat ratio calculator 140t described above are the same as the operations of the pilot ratio calculator 140p described earlier using FIG. 15. However, the increase time correction value Ci and the decrease time correction value Cd found by the correction value computer 142t of the top hat ratio calculator 140t are both negative values, and thus a THi ratio and THd ratio corrected by the corrector 151 (see FIG. 14) are both lower than the pre-correction $TH_0$ ratio.

The foregoing describes an example of correcting the $TH_0$ ratio for a combustor 31 in which there is a strong tendency for combustion oscillation to occur during high load percentages. However, there are also combustors in which there is a strong tendency for combustion oscillation to occur at medium load percentages such as approximately 50% to 60%. In this case, the correction value computer 142t determines a correction value for a medium load percentage as the correction value of the $TH_0$ ratio. Additionally, the foregoing describes an example of correcting the $TH_0$ ratio for a combustor 31 capable of suppressing combustion oscillation by reducing the TH ratio. However, there are also combustors capable of suppressing combustion oscillation by increasing the ratio. In this case, the corrector 151 determines a positive correction value for correcting the $TH_0$ ratio, and adds that correction value to the $TH_0$ ratio. Additionally, in the foregoing, the decrease time correction value Cd is set to be greater than the increase time correction value Ci at the same load percentage % Load. However, depending on the combustor, there are also cases where the decrease time correction value Cd is set to be lower than the increase time correction value Ci at the same load percentage % Load.

Figure 8:
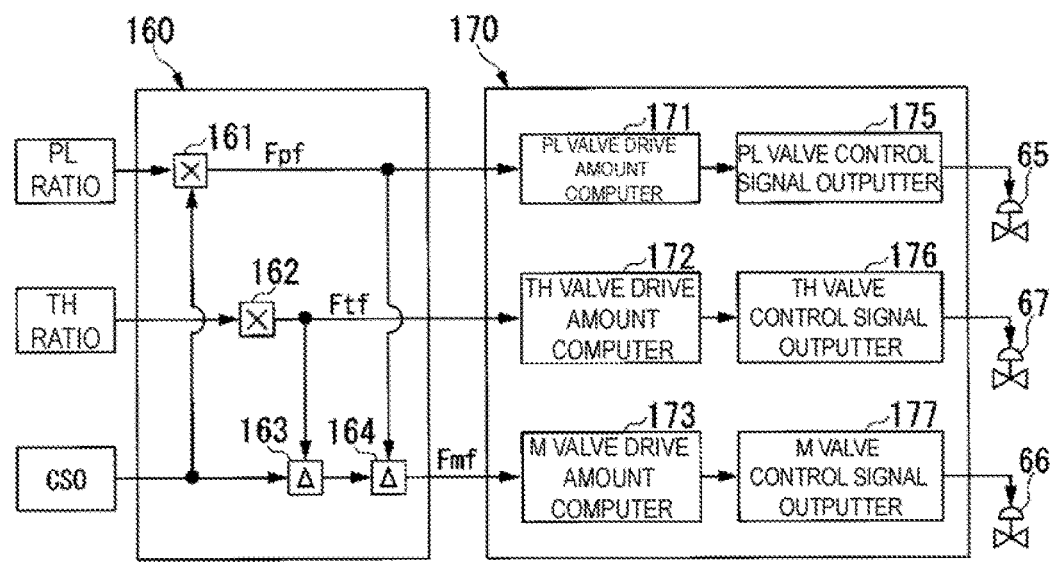
FIG. 8 is a function block diagram illustrating a system flow volume computer and a valve controller according to the embodiment of the present invention.

As illustrated in FIG. 8, the system flow volume computer 160 has: a first multiplier 161 that finds the pilot fuel flow volume Fpf using the PL ratio found by the pilot ratio calculator 140p; a second multiplier 162 that finds the top hat fuel flow volume Ftf using the TH ratio found by the top hat ratio calculator 140t; a first subtractor 163 that subtracts the top hat fuel flow volume Ftf from the fuel flow volume command value CSO specifying the total fuel flow volume; and a second subtractor 164 that further subtracts the pilot fuel flow volume Fpf from the subtraction result obtained by the first subtractor 163.

The first multiplier 161 finds the pilot fuel flow volume Fpf by multiplying the fuel flow volume command value CSO specifying the total fuel flow volume by the FL ratio found by the pilot ratio calculator 140p, and outputs the pilot fuel flow volume Fpf to the valve controller 170. The second multiplier 162 finds the top hat fuel flow volume Ftf by multiplying the fuel flow volume command value CSO specifying the total fuel flow volume by the TH ratio found by the top hat ratio calculator 140t, and outputs the top hat fuel flow volume Ftf to the valve controller 170. The first subtractor 163 subtracts the top hat fuel flow volume Ftf from the fuel flow volume command value CSO specifying the total fuel flow volume, as described earlier. The second subtractor 164 further subtracts the pilot fuel flow volume Fpf from the subtraction result obtained by the first subtractor 163 and outputs the subtraction result to the valve controller 170 as a main fuel flow volume Fmf. In other words, the system flow volume computer 160 executes a system flow volume computation process of finding each fuel flow volume.

As illustrated in FIG. 8, the valve controller 170 has: a valve drive amount computer 171 that finds a drive amount of the pilot fuel valve 65; a valve control signal outputter 175 that outputs a control signal to the pilot fuel valve 65; a valve drive amount computer 172 that finds a drive amount of the top hat fuel valve 67; a valve control signal outputter 176 that outputs a control signal to the top hat fuel valve 67; a valve drive amount computer 173 that finds a drive amount of the main fuel valve 66; and a valve control signal outputter 177 that outputs a control signal to the main fuel valve 66.

The valve drive amount computer 171 that finds the drive amount of the pilot fuel valve 65 finds the drive amount of the pilot fuel valve 65 in accordance with the pilot fuel flow volume Fpf found by the system flow volume computer 160.

The valve control signal outputter 175 creates a control signal based on the drive amount of the pilot fuel valve 65 and outputs the control signal to the pilot fuel valve 65. The valve drive amount computer 172 that finds the drive amount of the top hat fuel valve 67 finds the drive amount of the top hat fuel valve 67 in accordance with the top hat fuel flow volume Ftf found by the system flow volume computer 160. The valve control signal outputter 176 creates a control signal based on the drive amount of the top hat fuel valve 67 and outputs the control signal to the top hat fuel valve 67. The valve drive amount computer 173 that finds the drive amount of the main fuel valve 66 finds the drive amount of the main fuel valve 66 in accordance with the main fuel flow volume Fmf found by the system flow volume computer 160. The valve control signal oututter 177 creates a control signal based on the drive amount of the main fuel valve 66 and outputs the control signal to the main fuel valve 66. In other words, the valve controller 170 executes a valve control process of outputting a control signal to each fuel valve.

Upon the control signals being outputted to the fuel valves 65, 66, and 67 from the valve control signal outputters 175, 176, and 177, respectively, the fuel valves 65, 66, and 67 operate in accordance with the drive amounts specified by the corresponding control signals. As a result, the pilot fuel Fp flows into the pilot fuel line 61 at the flow volume Fpf based on the PL ratio found by the pilot ratio calculator 140p. The top hat fuel Ft flows into the top hat fuel line 63 at the flow volume Ftf based on the ratio found by the top hat ratio calculator 140t. Additionally, the main fuel Fm flows into the main fuel line 62 at the flow volume Fmf obtained by subtracting the pilot fuel flow volume Fpf and the top hat fuel flow volume Ftf from the total fuel flow volume.

As described above, according to the present embodiment, the flow volume ratio of each fuel determined on the basis of the combustion load command value CLCSO is corrected in accordance with the load percentage of the gas turbine when the fuel flow volume command value CSO has fluctuated. Accordingly, transitional combustion oscillation occurring when the load changes can be suppressed, and the combustion stability in the combustor 31 can be increased. Moreover, according to the present embodiment, the combustion stability can be increased in combustors at times of load decreases and at times of load increases, as well as at times of runback operations.

The flow volume ratio calculators 140p and 140t of the present embodiment determine the pre-correction flow volume ratio of each fuel on the basis of the combustion load command value CLCSO. However, the flow volume ratio calculators 140p and 140t may determine the pre-correction flow volume ratio of each fuel on the basis of an inlet temperature correlated value, which is a value changing in correlation with changes in the inlet temperature of the combustion gas in the turbine 21 or which is this inlet temperature.

The combustion state in the combustor 31 can be specified by the above-described inlet temperature correlated value and a flow velocity correlated value changing in correlation with changes in a flow velocity of the combustion gas in the combustor 31. This flow velocity correlated value includes, in addition to the load percentage used when finding the correction value, the output of the gas turbine 10 (the generator output), the total flow volume of the fuels supplied to the combustor 31, the flow volume of air taken into the compressor 11, and the like. Accordingly, in the case where the above-described inlet temperature correlated value is taken as a first parameter and the pre-correction flow volume ratio of each fuel is determined using this first parameter, one of the output of the gas turbine 10, the flow volume of all fuels supplied to the combustor 31, the flow volume of air taken into the compressor 11, and the like may be taken as a second parameter and the correction value may be determined using this second parameter.

The fluctuation sensor 144 of the present embodiment senses a fluctuation in a load command by sensing a fluctuation in the fuel flow volume command value CSO. However, instead of the fuel flow volume command value CSO, the fluctuation sensor 144 may sense a fluctuation in a load correlated value that is a value changing in correlation with changes in the load of the gas turbine or that is a load value (the generator output).

INDUSTRIAL APPLICABILITY

According to an aspect of the present invention, the combustion stability can be increased in combustors at times of load decreases and at times of load increases, as well as at times of runback operations.

REFERENCE SIGNS LIST

10 Gas turbine
11 Compressor
14 IGV
21 Turbine
31 Combustor
33 Combustion liner (or transition piece)
43 Pilot burner
44 Pilot nozzle
51 Top hat nozzle
53 Main burner
54 Main nozzle
60 Fuel line
61 Pilot fuel line
62 Main fuel line
63 Top hat fuel line
65 Pilot fuel valve
66 Main fuel valve
67 Top hat fuel valve
71 RPM gauge
72 Output gauge
73 Intake temperature gauge
74 Intake pressure gauge
75 Blade path temperature gauge
76 Exhaust gas temperature gauge
100 Control device
110 Combustion load command generator
120 Load percentage computer
130 Fuel flow volume command generator (total flow volume computer)
140 Flow ratio calculation device (flow volume ratio calculator)
140p Pilot ratio calculator
14p $PL_0$ ratio computer (flow volume ratio computer)
142p Correction value computer
143pa Increase time correction value computer
143pb Decrease time correction value computer
144 Fluctuation sensor
151 Corrector
154 Adder (flow volume ratio corrector)
140t Top hat ratio calculator
141t $TH_0$ ratio computer (flow volume ratio computer)
142t Correction value computer 143*ta* Increase time correction value computer
143*tb* Decrease time correction value computer
160 System flow volume computer
70 Valve controller
180 Interface

The invention claimed is:

1. A flow ratio calculation device configured to be used in a gas turbine, the gas turbine including multiple fuel systems, a compressor configured to generate compressed air by compressing air, a combustor configured to generate a combustion gas by burning fuels from the multiple fuel systems in the compressed air, and a turbine configured to be driven by the combustion gas, the flow ratio calculation device being configured to calculate a flow volume ratio of the fuels in the multiple fuel systems, and the flow ratio calculation device comprising:
a flow volume ratio computer configured to receive a value of a first parameter among multiple parameters capable of expressing a combustion state in the combustor, and find the flow volume ratio based on the received value of the first parameter using a predetermined relationship between the first parameter and the flow volume ratio;
a correction value computer configured to find a correction value of the flow volume ratio corresponding to a load percentage indicating a current load with respect to a maximum load permitted for the gas turbine;
a fluctuation sensor configured to sense a fluctuation in a fuel flow volume command value specifying a total flow volume of the fuels supplied to the combustor; and
a corrector that, upon a fluctuation in the fuel flow volume command value being sensed by the fluctuation sensor, is configured to correct the flow volume ratio found by the flow volume ratio computer with the correction value found by the correction value computer.

2. The flow ratio calculation device according to claim 1, wherein the correction value computer is configured to receive a value of a second parameter, among the multiple parameters, that is different from the first parameter, and find the correction value based on the received value of the second parameter using a predetermined relationship between the second parameter and the correction value, and
wherein the second parameter is the load percentage.

3. The flow ratio calculation device according to claim 2, wherein:
the first parameter is an inlet temperature correlated value that is a value changing in correlation with changes in an inlet temperature of the combustion gas in the turbine or that is the inlet temperature.

4. The flow ratio calculation device according to claim 2, wherein:
the correction value includes an increase correction value and a decrease correction value;
the correction value computer includes an increase time correction value computer configured to find the increase correction value based on the value of the second parameter when the fuel flow volume command value is increasing, using a predetermined increase time relationship between the second parameter and the increase correction value at a time when the fuel flow volume command value is increasing, and a decrease time correction value computer configured to find the decrease correction value based on the value of the second parameter when the fuel flow volume command value is decreasing, using a predetermined decrease time relationship between the second parameter and the decrease correction value at a time when the fuel flow volume command value is decreasing; and
the corrector is configured to correct the flow volume ratio found by the flow volume ratio computer with the increase correction value upon the fluctuation sensor sensing an increase in the fuel flow volume command value, and correct the flow volume ratio found by the flow volume ratio computer with the decrease correction value upon the fluctuation sensor sensing a decrease in the fuel flow volume command value.

5. The flow ratio calculation device according to claim 4, wherein:
the combustor includes a pilot burner and a main burner configured to spray the fuels;
the gas turbine includes, as the multiple fuel systems, a pilot fuel system configured to supply a first of the fuels to the pilot burner and a main fuel system configured to supply a second of the fuels to the main burner;
the flow volume ratio includes a pilot fuel ratio that is a ratio of a flow volume of the first of the fuels relative to the total flow volume of the fuels supplied to the combustor from the multiple fuel systems; and
the correction value computer is configured to calculate the correction value so as to increase the pilot fuel ratio calculated by the flow volume ratio computer.

6. The flow ratio calculation device according to claim 5, wherein, upon the fluctuation sensor sensing a decrease in the fuel flow volume command value, the corrector is configured to correct the pilot fuel ratio using the correction value found by the correction value computer so that the pilot fuel ratio calculated by the flow volume ratio computer increases.

7. The flow ratio calculation device according to claim 2, wherein:
the combustor includes a pilot burner and a main burner configured to spray fuels;
the gas turbine includes, as the multiple fuel systems, a pilot fuel system configured to supply a first of the fuels to the pilot burner and a main fuel system configured to supply a second of the fuels to the main burner;
the flow volume ratio includes a pilot fuel ratio that is a ratio of a flow volume of the first of the fuels relative to the total flow volume of the fuels supplied to the combustor from the multiple fuel systems;
the correction value includes an increase correction value and a decrease correction value;
the correction value computer includes an increase time correction value computer configured to find the increase correction value based on the value of the second parameter when the fuel flow volume command value is increasing, using a predetermined increase time relationship between the second parameter and the increase correction value at a time when the fuel flow volume command value is increasing, and a decrease time correction value computer configured to find the decrease correction value based on the value of the second parameter when the fuel flow volume command value is decreasing, using a predetermined decrease time relationship between the second parameter and the decrease correction value at a time when the fuel flow volume command value is decreasing;
the corrector is configured to correct the flow volume ratio found by the flow volume ratio computer with the increase correction value upon the fluctuation sensor sensing an increase in the fuel flow volume command value, and correct the flow volume ratio found by the flow volume ratio computer with the decrease correction value upon the fluctuation sensor sensing a decrease in the fuel flow volume command value; and the decrease time correction value computer is configured to calculate the decrease correction value such that the decrease correction value is greater than the increase correction value when the value of the second parameter is the same value.

8. The flow ratio calculation device according to claim 1, wherein:
the combustor includes a pilot burner and a main burner configured to spray the fuels;
the gas turbine includes, as the multiple fuel systems, a pilot fuel system configured to supply a first of the fuels to the pilot burner and a main fuel system configured to supply a second of the fuels to the main burner; and
the flow volume ratio includes a pilot fuel ratio that is a ratio of a flow volume of the first of the fuels relative to the total flow volume of the fuels supplied to the combustor from the multiple fuel systems.

9. The flow ratio calculation device according to claim 1, wherein:
the combustor includes a burner configured to spray a first of the fuels;
the gas turbine includes, as the multiple fuel systems, a burner fuel system configured to supply the first of the fuels to the burner and a top hat fuel system configured to supply a second of the fuels into air delivered to the burner; and
the flow volume ratio includes a top hat fuel ratio that is a ratio of a flow volume of the second of the fuels relative to the total flow volume of the fuels supplied to the combustor from the multiple fuel systems.

10. A control device comprising:
the flow ratio calculation device according to claim 1;
a total flow volume computer configured to find the total flow volume of the fuels supplied to the combustor from the multiple fuel systems;
a system flow volume computer configured to find a fuel flow volume for each of the multiple fuel systems using the total flow volume found by the total flow volume computer and the flow volume ratio calculated by the flow ratio calculation device; and
a valve controller configured to receive the fuel flow volume for each of the multiple fuel systems and to output a control signal.

11. The control device according to claim 10, further comprising:
a combustion load command generator configured to generate a combustion load command value changing in positive correlation with changes in an inlet temperature of the combustion gas in the turbine,
wherein the flow volume ratio computer of the flow ratio calculation device is configured to calculate the flow volume ratio based on the combustion load command value, using the combustion load command value as the value of the first parameter.

12. A gas turbine plant comprising:
the control device according to claim 10; and
the gas turbine.

13. A flow ratio calculation method used in a gas turbine, the gas turbine including multiple fuel systems, a compressor that generates compressed air by compressing air, a combustor that generates a combustion gas by burning fuels from the multiple fuel systems in the compressed air, and a turbine driven by the combustion gas, the flow volume ratio calculation method calculating a flow volume ratio of the fuels flowing in the multiple fuel systems, and the flow volume ratio calculation method comprising:
a flow volume ratio computation process of receiving a value of a first parameter among multiple parameters capable of expressing a combustion state in the combustor, and finding the flow volume ratio based on the received value of the first parameter using a predetermined relationship between the first parameter and the flow volume ratio;
a correction value computation process of finding a correction value of the flow volume ratio corresponding to a load percentage indicating a current load with respect to a maximum load permitted for the gas turbine;
a fluctuation sensing process of sensing a fluctuation in a fuel flow volume command value specifying a total flow volume of the fuels supplied to the combustor; and
a correction process of, upon a fluctuation in the fuel flow volume command value being sensed in the fluctuation sensing process, correcting the flow volume ratio found in the flow volume ratio computation process with the correction value found in the correction value computation process.

14. The flow ratio calculation method according to claim 13,
wherein, in the correction value computation process, a value of a second parameter, among the multiple parameters, that is different from the first parameter is received, and the correction value based on the received value of the second parameter is found using a predetermined relationship between the second parameter and the correction value, and
wherein the second parameter is the load percentage.

15. The flow ratio calculation method according to claim 14,
wherein:
the first parameter is an inlet temperature correlated value that is a value changing in correlation with changes in an inlet temperature of the combustion gas in the turbine or that is the inlet temperature.

16. The flow ratio calculation method according to claim 14,
wherein:
the correction value includes an increase correction value and a decrease correction value;
the correction value computation process includes an increase time correction value computation process of finding the increase correction value based on the value of the second parameter when the fuel flow volume command value is increasing, using a predetermined increase time relationship between the second parameter and the increase correction value of the flow volume ratio at a time when the fuel flow volume command value is increasing, and a decrease time correction value computation process of finding the decrease correction value based on the value of the second parameter when the fuel flow volume command value is decreasing, using a predetermined decrease time relationship between the second parameter and the decrease correction value of the flow volume ratio at a time when the fuel flow volume command value is decreasing; and
in the correction process, upon an increase in the fuel flow volume command value being sensed in the fluctuation sensing process, the flow volume ratio found in the flow volume ratio computation process is corrected with the increase correction value, and upon a decrease in the fuel flow volume command value being sensed in the fluctuation sensing process, the flow volume ratio found in the flow volume ratio computation process is corrected with the decrease correction value.

17. A fuel system control method that executes the flow ratio calculation method according to claim 13, the fuel system control method further executing:
   a total flow volume computation process of finding the total flow volume of the fuels supplied to the combustor from the multiple fuel systems;
   a system flow volume computation process of finding a fuel flow volume for each of the multiple fuel systems using the total flow volume found in the total flow volume computation process and the flow volume ratio calculated by the flow ratio calculation method; and
   a valve control process of receiving the fuel flow volume for each of the multiple fuel systems and outputting a control signal.

* * * * *